（12) United States Patent
Du et al.

(10) Patent No.: US 12,086,344 B2
(45) Date of Patent: Sep. 10, 2024

(54) TOUCH SENSING METHOD AND APPARATUS

(71) Applicant: BEIJING TAIFANG TECHNOLOGY CO., LTD., Beijing (CN)

(72) Inventors: Chaoliang Du, Beijing (CN); Jiaojiao Tao, Beijing (CN); Xiong Lei, Beijing (CN); Wang Jia, Beijing (CN)

(73) Assignee: Beijing Taifang Technology Co., Ltd., Beijing (CN)

( * ) Notice: Subject to any disclaimer, the term of this patent is extended or adjusted under 35 U.S.C. 154(b) by 0 days.

(21) Appl. No.: 18/155,100

(22) Filed: Jan. 17, 2023

(65) Prior Publication Data
US 2023/0359297 A1    Nov. 9, 2023

(30) Foreign Application Priority Data
May 5, 2022    (CN) .......................... 202210482377.X

(51) Int. Cl.
*G06F 3/041*    (2006.01)
(52) U.S. Cl.
CPC .......... *G06F 3/0414* (2013.01); *G06F 3/0418* (2013.01)

(58) Field of Classification Search
CPC .. G06F 3/0414; G06F 3/04144; G06F 3/0418; G06F 3/043; G06F 3/0436
See application file for complete search history.

(56) References Cited

U.S. PATENT DOCUMENTS

| | | | |
|---|---|---|---|
| 2020/0133455 A1* | 4/2020 | Sepehr | G06F 3/0488 |
| 2022/0100308 A1* | 3/2022 | Du | G06F 3/0433 |

FOREIGN PATENT DOCUMENTS

| | | |
|---|---|---|
| CN | 115933864 A | 4/2023 |
| CN | 115933901 A | 4/2023 |
| CN | 117055747 A | 11/2023 |

* cited by examiner

*Primary Examiner* — Temesghen Ghebretinsae
*Assistant Examiner* — Ivelisse Martinez Quiles
(74) *Attorney, Agent, or Firm* — Thomas | Horstemeyer, LLP

(57) ABSTRACT

Disclosed are a touch sensing method and apparatus, applied to a touch sensing apparatus including at least one elastic wave sensor, the method includes: acquiring an elastic wave signal detected by at least one elastic wave sensor mounted on the touch sensing apparatus; determining a feature of the elastic wave signal, including: a synchronous feature, an asynchronous feature, or a preset tap waveform feature; and performing touch sensing according to the feature of the elastic wave signal.

19 Claims, 17 Drawing Sheets

TOUCH SENSING METHOD AND APPARATUS

CROSS-REFERENCE TO RELATED APPLICATION

The present application claims priority of Chinese Patent Application No. 202210482377. X filed with CNIPA on May 5, 2022, the contents of which are incorporated herein by reference.

TECHNICAL FIELD

Embodiments of the present disclosure relate to, but are not limited to, the field of electronic technologies, in particular to a touch sensing method and a touch sensing apparatus.

BACKGROUND

With continuous development and popularization of terminal devices, human-computer interaction technology has an important impact on applications of terminal devices. At present, finger touch sensing has always been considered as a more intuitive and more convenient interactive technology for communication with a terminal device. Therefore, it is very important for the terminal device to recognize a user's finger touch sensing, and accuracy of touch sensing will affect the user's experience, and how to improve the accuracy of the touch sensing has become a problem to be solved urgently.

SUMMARY

The following is a summary of the subject matter described in detail herein. This summary is not intended to limit the protection scope of the claims.

An embodiment of the present disclosure provides a touch sensing method, which is applied to a touch sensing apparatus including at least one elastic wave sensor and includes: acquiring an elastic wave signal detected by at least one elastic wave sensor mounted on the touch sensing apparatus; determining a feature of the elastic wave signal, wherein the feature includes: a synchronous feature, an asynchronous feature, or a preset tap waveform feature of touch sensing; and performing touch sensing according to the feature of the elastic wave signal.

An embodiment of the present disclosure also provides a touch sensing apparatus, which includes a signal processing apparatus and at least one elastic wave sensor, wherein the signal processing apparatus is electrically connected with each elastic wave sensor and is used for the aforementioned touch sensing method.

Other aspects will become apparent after reading and understanding the figures and detailed description.

BRIEF DESCRIPTION OF DRAWINGS

Accompanying drawings are used for providing understanding of technical solutions of the present disclosure, consisting a part of the specification, and explaining technical solutions of the present disclosure together with embodiments of the present disclosure, not limit the technical solutions of the present disclosure instead.

DETAILED DESCRIPTION

Figure 1:
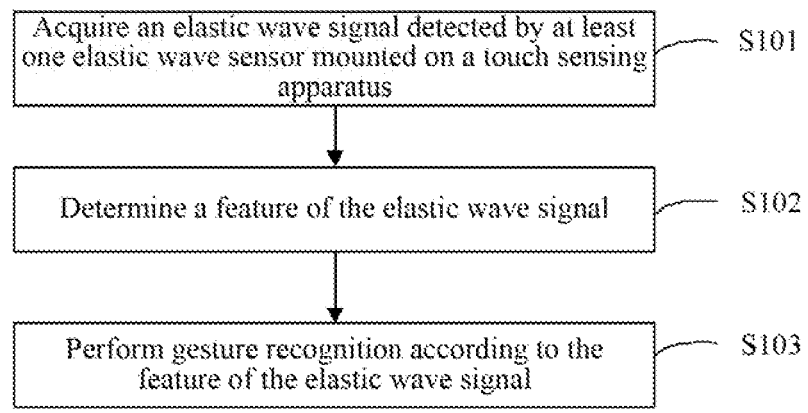
FIG. 1 is a flowchart of a touch sensing method according to an exemplary embodiment of the present disclosure.

Multiple embodiments are described in the present application, but the description is exemplary rather than restrictive, and it is obvious to those of ordinary skills in the art that there may be more embodiments and implementation solutions included in the scope of the embodiments described in the present application. Although many possible combinations of features are shown in the drawings and discussed in the detailed description, many other combinations of the disclosed features are also possible. Unless otherwise noted, any feature or element of any embodiment may be used in combination with, or may be substituted for, any other feature or element in any other embodiment.

FIG. 1 is a flowchart of a touch sensing method according to an exemplary embodiment of the present disclosure. As shown in FIG. 1, the touch sensing method may include S101, S102, and S103.

S101: acquiring an elastic wave signal detected by at least one elastic wave sensor mounted on a touch sensing apparatus.

In this embodiment, touching the touch sensing apparatus by a hand of a user may be used as an excitation source to drive vibration or deformation of the touch sensing apparatus to generate an elastic wave signal, and touch sensing on the touch sensing apparatus may be performed based on the generated elastic wave signal, thereby improving accuracy of the touch sensing. The touch sensing apparatus can be a display screen. An elastic wave is a stress wave, which is caused by disturbance or an external force and is a form of transmission of stress and strain in an elastic medium. There is an interactive elastic force between particles in the elastic medium. When a particle of matter at a certain position leaves an equilibrium position, that is, when strain occurs, the particle vibrates under an action of an elastic force, and at the same time, it causes strain and vibration of surrounding particles. A propagation process of such vibration in an elastic medium is called an elastic wave.

Figure 10:
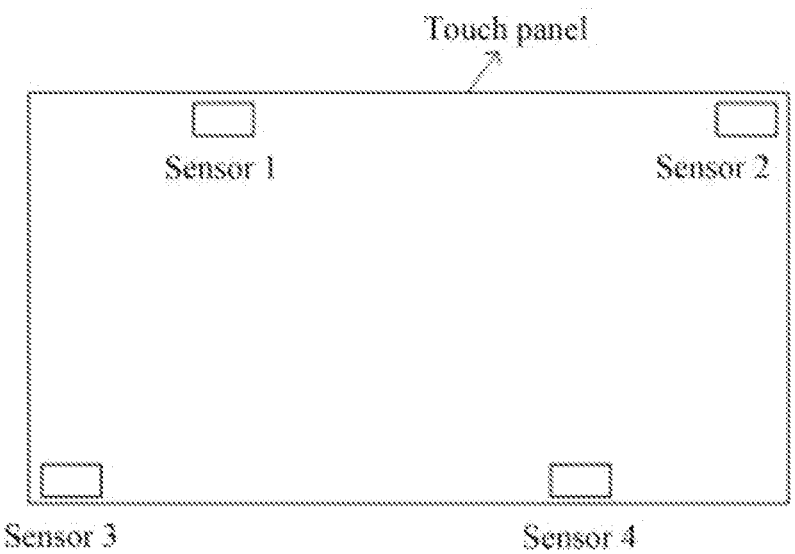
FIG. 10 is a schematic diagram of a touch screen arranged with multiple elastic wave sensors according to an embodiment of the present disclosure.

An elastic wave sensor may be disposed on the touch sensing apparatus, and an elastic wave signal generated when a hand touches the touch sensing apparatus may be acquired by one or more disposed elastic wave sensors. When a quantity of elastic wave sensors is multiple, positions of the multiple elastic wave sensors on the touch sensing apparatus are different, and the elastic wave sensors may be arranged in an array or may be in a staggered arrangement, as shown in FIG. 10. Different quantities of elastic wave sensors may be selected according to a positioning range. Generally, the larger the positioning range, the more elastic wave sensors are needed for improving positioning accuracy.

In an alternative embodiment, an elastic wave sensor may be disposed on a body or a housing of a device where the touch sensing apparatus is located. For example, an elastic wave sensor may be disposed on a body or a housing of a terminal device.

The elastic wave sensor may be a sensor with positive piezoelectric effect and inverse piezoelectric effect, such as a piezoelectric sensor, and types of the piezoelectric sensor may include piezoelectric ceramic sensor, piezoelectric thin film sensor, and piezoelectric crystal sensors, etc.

S102: determining a feature of the elastic wave signal, including: a synchronous feature, an asynchronous feature, or a preset tap waveform feature of touch sensing.

In this embodiment, the touch sensing may be performed by determining the feature of the elastic wave signal, such as the synchronous feature, the asynchronous feature, or the preset tap waveform feature of touch sensing.

The synchronization feature means that a phase difference between multiple elastic wave signals is less than or equal to a preset time difference, or a phase difference between peaks or troughs of multiple elastic wave signals is less than or equal to a preset time difference (including any of following situations: a phase difference between peaks of multiple elastic wave signals is less than or equal to a preset time difference, and a phase difference between troughs of multiple elastic wave signals is less than or equal to a preset time difference).

The asynchronous feature means that a phase difference between peaks or troughs of multiple elastic wave signals is larger than a preset time difference, and multiple elastic wave signals will not intersect at a same time point in the process of touch sensing.

The preset tap waveform feature of touch sensing refers to preset tap touch sensing waveforms corresponding to different predefined tap gesture types.

S103: performing touch sensing according to the feature of the elastic wave signal.

In this embodiment, whether current touch sensing is taping or sliding may be recognized according to whether there is a synchronous feature or asynchronous feature among multiple elastic wave signals, or whether the current touch sensing is taping or not may be recognized according to whether a waveform of one elastic wave signal is a preset tap touch sensing waveform.

In an example, a quantity of the elastic wave sensors may be multiple, and the performing the touch sensing according to the feature of the elastic wave signal in the step S103, may include: recognizing current touch sensing as taping when multiple elastic wave signals corresponding to multiple elastic wave sensors have a synchronization feature; and recognizing current touch sensing as sliding when multiple elastic wave signals corresponding to multiple elastic wave sensors have an asynchronous feature.

In this embodiment, the touch sensing may be achieved based on multiple elastic wave sensors on the touch sensing apparatus, and touch sensing of position invariant and position variant types may be achieved according to whether multiple elastic wave signals corresponding to the multiple elastic wave sensors have a synchronous feature or asynchronous feature. Touch sensing of a position invariant type may include a taping gesture such as single taping, multiple taps, or long-time pressing, and touch sensing of a position variant type may include directional sliding, for example, a sliding gesture such as sliding up, sliding down, sliding left, or sliding right. The gesture described herein may be understood as one or more trajectories left by a hand on the touch sensing apparatus, which may be one point or more points (such as a taping gesture, also called taping), or may be one line or more lines (such as a sliding gesture, also called sliding), so the touch sensing herein may also be called gesture recognition. In an exemplary embodiment, at least one elastic wave sensor may be provided for recognizing a taping gesture and at least two elastic wave sensors may be provided for recognizing a sliding gesture.

In an example, a quantity of elastic wave sensors may be one, and the performing the touch sensing according to the feature of elastic wave signal in the step S103, may include: determining current touch sensing as taping when a waveform of the elastic wave signal is a preset tap touch sensing waveform.

In this embodiment, the touch sensing may be achieved based on one elastic wave sensor on the touch sensing apparatus, and touch sensing of a position invariant type may be achieved according to whether a waveform of the elastic wave signal accords with a preset tap touch sensing waveform.

Preset tap touch sensing waveforms corresponding to different taping gesture types may be predefined, an elastic wave signal detected by the elastic wave sensor is compared with a preset tap touch sensing waveform, and when a waveform of the elastic wave signal is the preset tap touch sensing waveform, the current touch sensing is determined as taping. When the waveform of the elastic wave signal is not the preset tap touch sensing waveform, the current touch sensing is determined as non-taping.

In the touch sensing method according to the embodiment of the present disclosure, touching the touch sensing apparatus by a user's hand is used as an excitation source to drive the touch sensing apparatus to vibrate or deform to generate an elastic wave signal. The elastic wave signal is detected by at least one elastic wave sensor that is disposed, and touch sensing on the touch sensing apparatus may be performed based on the elastic wave signal, thus achieving touch sensing of the user and improving human-computer interaction experience of the user.

Figure 2:
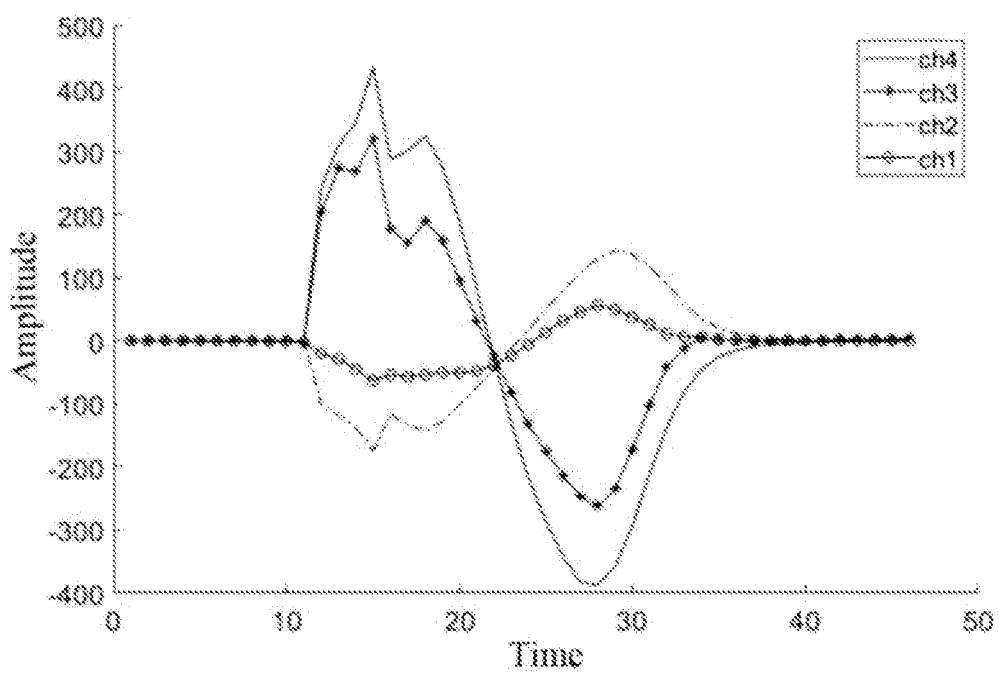
FIG. 2 is a schematic diagram showing that multiple elastic wave signals have a synchronization feature according to an exemplary embodiment of the present disclosure.

FIG. 2 is a schematic diagram showing that multiple elastic wave signals have a synchronization feature according to an exemplary embodiment of the present disclosure. As shown in FIG. 2, the synchronization feature means that a phase difference between multiple elastic wave signals corresponding to multiple elastic wave sensors is less than or equal to a preset phase difference. The synchronization feature may be that amplitudes, in time sequence, of multiple elastic wave signals corresponding to multiple elastic wave sensors start to change synchronously (including positive fluctuation and negative fluctuation), and peaks or troughs appear simultaneously, and will intersect at a same point in the middle. Or, the synchronization feature may be that multiple elastic wave signals corresponding to multiple elastic wave sensors are changed synchronously (including positive fluctuation and negative fluctuation) within a certain time difference threshold (a preset time difference), and for multiple elastic wave signals corresponding to multiple elastic wave sensors, peaks or troughs simultaneously appear within a certain time difference threshold (a preset time difference).

In an example, for wave-type elastic wave sensors, a synchronization feature means that multiple elastic wave signals corresponding to multiple elastic wave sensors intersect at a same point in the middle, or a synchronization feature may be that multiple elastic wave signals corresponding to multiple elastic wave sensors intersect within a certain time difference threshold (a preset time difference) in the middle. For non-wave type elastic wave sensors (such as piezoresistive sensors), multiple elastic wave signals corresponding to multiple elastic wave sensors do not necessarily have an intersection point in the middle, but amplitudes between start and end are changed synchronously.

Figure 3:
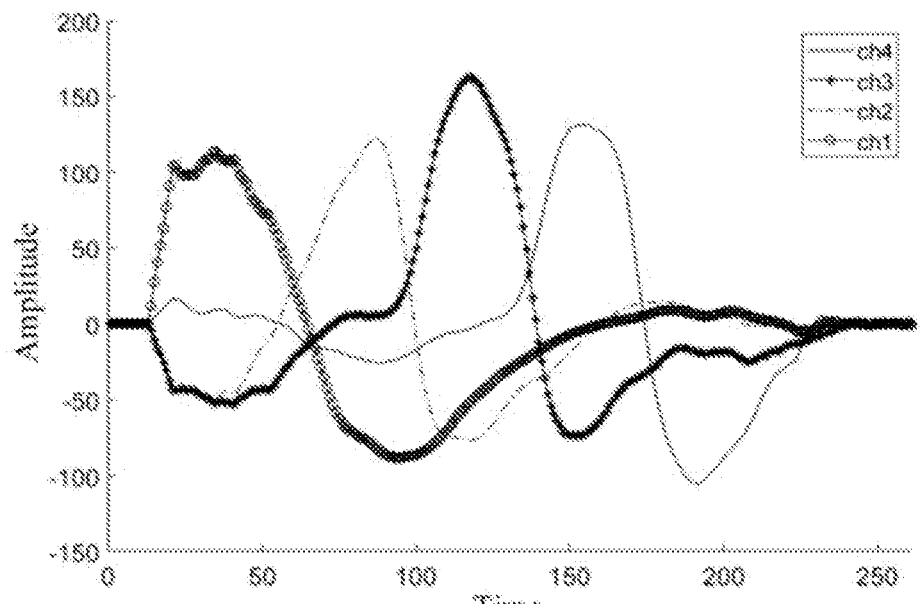
FIG. 3 is a schematic diagram showing that multiple valid elastic wave signals have an asynchronous feature according to an exemplary embodiment of the present disclosure.

FIG. 3 is a schematic diagram showing that multiple elastic wave signals have an asynchronous feature according to an exemplary embodiment of the present disclosure. As shown in FIG. 3, the asynchronous feature means that a phase difference between multiple elastic wave signals corresponding to multiple elastic wave sensors is greater than a preset phase difference. The asynchronous feature means that peak values of the multiple elastic wave signals corresponding to the multiple elastic wave sensors are changed in a sequential order, and multiple elastic wave signals will not intersect at a same time point in the process of touch sensing. Peak value changes may be that positive peak values (peaks) are changed in a sequential order, and/or negative peak values (troughs) are changed in a sequential order. As shown in FIG. 3, taking four elastic wave sensors disposed as an example, elastic wave signals corresponding to the four elastic wave sensors are ch1, ch2, ch3, and ch4 respectively, and a sequential order of peak value changes is: a peak or trough of the signal ch1 appears→a peak or trough of the signal ch2 appears→a peak or trough of the signal ch3 appears→a peak or trough of the ch4 appears, and → means earlier than.

Based on an extracted touch sensing feature of a synchronous feature or an asynchronous feature, current touch sensing of a user is recognized. Touch sensing categories may be predefined, and the touch sensing categories may be defined as, for example, a taping and a slide. For example, when the multiple elastic wave signals corresponding to the multiple elastic wave sensors have a synchronous feature, current touch sensing is determined as taping. When the multiple elastic wave signals corresponding to the multiple elastic wave sensors have an asynchronous feature, current touch sensing is determined as sliding.

In an exemplary embodiment of the present disclosure, after recognizing the current touch sensing as taping, the method may further include: acquiring multiple touch sensing results within preset time; determining that the current touch sensing is single taping when there is only one tap in touch sensing results of multiple consecutive detection periods within the preset time, determining that the current touch sensing is D times of taps when there is a taping in each touch sensing result of D times of consecutive detection periods within the preset time, wherein D is greater than or equal to 2.

In this embodiment, the predefined touch sensing categories may include: single taping and multiple taping. For example, when multiple elastic wave signals have a synchronous feature and are from a single action within a detection period, it is recognized as single taping. When multiple elastic wave signals have a synchronous feature and are from multiple corresponding actions within multiple detection periods, one action corresponds to one detection period, and it is recognized as multiple taps.

In an exemplary embodiment of the present disclosure, after recognizing the current touch sensing as taping, the method may further include: determining whether the taping is a pressing gesture pressing for a predefined time by the time length of an elastic wave signal.

In this embodiment, predefined touch sensing categories may include: long pressing, which refers to pressing for a predefined time greater than or equal to a pressing time threshold. Long pressing may be called pressing for a predefined time. When multiple elastic wave signals have a synchronous feature and pressing time of this action exceeds a certain time threshold, it is recognized as the long pressing.

In an example, the determining whether the taping is the pressing gesture for a predefined time according to the time length of the elastic wave signal may include: determining the taping as a pressing gesture for a predefined time when a time length of any one elastic wave signal is greater than or equal to a first pressing time threshold.

According to whether the multiple elastic wave signals have a synchronization feature and a time length of any one elastic wave signal, it may be determined whether the current touch sensing is a pressing gesture for a predefined time. When the multiple elastic wave signals have the synchronous feature and a time length of any one elastic wave signal is greater than or equal to the first pressing time threshold, the current touch sensing is determined to be a pressing gesture for a predefined time. When the multiple elastic wave signals have the synchronous feature and time lengths of the multiple elastic wave signals are all less than the first pressing time threshold, the current touch sensing is determined as taping. The first pressing time threshold may be determined according to an empirical value, which is not limited or repeated here in this embodiment.

In another example, the determining whether the taping is the pressing gesture for a predefined time according to the time length of the elastic wave signal may include: determining a time length of each of the multiple elastic wave signals, and determining the taping as a pressing gesture for a predefined time when a maximum time length of the multiple elastic wave signals is greater than or equal to a second pressing time threshold.

According to whether the multiple elastic wave signals have the synchronization feature and the time length of each elastic wave signal, it may be determined whether the current touch sensing is a pressing gesture for a predefined time. When the multiple elastic wave signals have a synchronization feature, and the maximum time length of the multiple elastic wave signals is greater than or equal to the second pressing time threshold, the current touch sensing is determined as a pressing gesture for a predefined time. When the multiple elastic wave signals have the synchronous feature and the time lengths of the multiple elastic wave signals are all less than the second pressing time threshold, the current touch sensing is determined as taping. The second pressing time threshold may be determined according to an empirical value, which is not limited or repeated here in this embodiment.

In an exemplary embodiment of the present disclosure, after recognizing the current touch sensing as sliding, the method may further include: determining a sliding direction according to positions where multiple elastic wave sensors corresponding to multiple elastic wave signals with successively appearing peaks or troughs are located, for example, when a position where an elastic wave sensor corresponding to an elastic wave signal with an earliest peak or trough is located is a first position and a position where an elastic wave sensor corresponding to an elastic wave signal with a latest peak or trough is located is a second position, the sliding direction is determined as: from the first position to the second position.

In this embodiment, predefined touch sensing categories may include: sliding in a certain direction, such as sliding left, sliding right, sliding up, or sliding down.

Whether the current touch sensing is sliding or not and a sliding direction of the sliding may be determined according to whether multiple elastic wave signals have an asynchronous feature and changes of positions of elastic wave sensors corresponding to a sequential relationship of time when elastic wave signals sequential peak values.

As shown in FIG. 3, elastic wave signals corresponding to the four elastic wave sensors are ch1, ch2, ch3, and ch4 respectively, and a sequential order of peak value changes is: a peak or trough of the signal ch1 appears→a peak or trough of the signal ch2 appears→a peak or trough of the signal ch3 appears→a peak or trough of the signal ch4 appears, and → means earlier than. When the signals ch1, ch2, ch3, and ch4 have an asynchronous feature, and a position of an elastic wave sensor corresponding to the signal ch1 is a first position and a position of an elastic wave sensor corresponding to the signal ch4 is a second position, the current touch sensing is determined to be sliding, and the sliding direction of the sliding is from the first position to the second position.

In an example, the first position is left (or right), the second position is right (or left), and the sliding direction of the sliding is from left (or right) to right (or left).

In an example, the first position is up (or down), the second position is down (or up), and the sliding direction of the slide is from up (or down) to down (or up).

In an exemplary embodiment of the present disclosure, the touch sensing method may further include: determining a valid elastic wave signal after acquiring the elastic wave signal.

The determining the valid elastic wave signal may include: determining a signal start point and a signal end point of touching the touch sensing apparatus by a hand in the elastic wave signal according to an amplitude of the elastic wave signal.

In this embodiment, endpoint detection may be performed according to the amplitude of the elastic wave signal, the signal start point and the signal end point of touching the touch sensing apparatus by the hand in the elastic wave signal are determined, an elastic wave signal between the signal start point and the signal end point is taken as a valid elastic wave signal, and touch sensing is performed based on the valid elastic wave signal to improve accuracy of touch sensing. The signal start point may be simply referred to as a start point, and the signal end point may be simply referred to as an end point.

In an example, the determining the signal start point and the signal end point of touching the touch sensing apparatus by the hand in the elastic wave signal according to the amplitude of the elastic wave signal may include: determining the signal start point and the signal end point according to an amplitude of one elastic wave signal, taking a minimum time point corresponding to an amplitude whose absolute value of the elastic wave signal is greater than a first threshold as the signal start point, and taking a minimum time point corresponding to an amplitude whose absolute value of the elastic wave signal is smaller than a second threshold as the signal end point.

Endpoint detection may be performed according to an elastic wave signal detected by one elastic wave sensor, and an absolute value of an amplitude of the elastic wave signal is compared with the first threshold and the second threshold respectively, to determine the signal start point and the signal end point of touching the touch sensing apparatus by the hand in the elastic wave signal. The first threshold and the second threshold may be determined according to empirical values, which is not limited or repeated here in this embodiment.

In an example, the determining the signal start point and the signal end point of touching the touch sensing apparatus by the hand in the elastic wave signal according to the amplitude of the elastic wave signal may include: determining the signal start point and the signal end point according to amplitudes of multiple elastic wave signals, acquiring a cumulative value of absolute values of amplitudes of multiple elastic wave signals at a same time point, taking a minimum time point corresponding to a cumulative value larger than a third threshold as the signal start point, and taking a minimum time point corresponding to a cumulative value smaller than a fourth threshold as the signal end point.

Endpoint detection may be performed according to elastic wave signals detected by multiple elastic wave sensors, and a cumulative value of absolute values of amplitudes of the multiple elastic wave signals at a same time point is compared with the third threshold and the fourth threshold respectively to determine the signal start point and the signal end point of touching the touch sensing apparatus by the hand in the elastic wave signal. The third threshold and the fourth threshold may be determined according to empirical values, which is not limited or repeated here in this embodiment.

In an example, the determining the signal start point and the signal end point of touching the touch sensing apparatus by the hand in the elastic wave signal according to the amplitude of the elastic wave signal may include: determining the signal start point and the signal end point according to amplitudes of multiple elastic wave signals, acquiring a cumulative average value of absolute values of amplitudes of multiple elastic wave signals at a same time point, taking a minimum time point corresponding to a cumulative average value larger than a fifth threshold as the signal start point, and taking a minimum time point corresponding to a cumulative average value smaller than a sixth threshold as the signal end point.

Endpoint detection may be performed according to elastic wave signals detected by multiple elastic wave sensors, and a cumulative average value of absolute values of amplitudes of the multiple elastic wave signals at a same time point is compared with the fifth threshold and the sixth threshold respectively to determine the signal start point and the signal end point of touching the touch sensing apparatus by the hand in the elastic wave signal. The fifth threshold and the sixth threshold may be determined according to empirical values, which is not limited or repeated here in this embodiment.

In an example, the determining the valid elastic wave signal may further include: intercepting an elastic wave signal between the signal start point and the signal end point and taking the intercepted signal as the valid elastic wave signal. In this embodiment, an elastic wave signal between the signal start point and the signal end point may be directly intercepted to obtain the valid elastic wave signal.

In an example, an elastic wave signal between the signal start point and the signal end point is intercepted, and the intercepted signal is reduced or amplified in time domain to obtain a valid elastic wave signal with a preset length.

Different gestures, different user operation habits, and other factors, will lead to different durations of touch sensing signals. In order to facilitate touch sensing, an intercepted signal may be reduced or amplified in time domain to have a same length, and an obtained valid elastic wave signal is a*b, wherein a is a signal length (preset length) of each valid elastic wave signal, b is a quantity of elastic wave sensors, and b is greater than or equal to 1.

When a length of the intercepted signal is larger than a preset length, signal sampling is performed to obtain a valid elastic wave signal with the preset length; when the length of the intercepted signal is less than the preset length, signal interpolation is performed to obtain a valid elastic wave signal with the preset length.

In an exemplary embodiment of the present disclosure, after the determining the signal start point and the signal end point of touching the touch sensing apparatus by the hand in the elastic wave signal according to the amplitude of the elastic wave signal, the method may further include: correcting the signal start point and the signal end point, which includes: determining a position of a maximum amplitude between the signal start point and the signal end point, taking the position of the maximum amplitude as a center to extend to both ends of a signal respectively, finding a left position and a right position respectively where a difference between two adjacent amplitudes is less than a difference threshold, and taking the left position as a corrected signal start point and taking the right position as a corrected signal end point.

The signal start point may include the corrected signal start point, and the signal end point may include the corrected signal end point.

Endpoint correction may be performed on a signal start point and a signal end point of touching the touch sensing apparatus by a hand in a determined elastic wave signal, a position of a maximum amplitude between the signal start point and the signal end point is taken as a middle point position of a signal, so as to extend to both ends, a corrected signal start point and a corrected signal end point are determined according to a difference between two adjacent amplitudes, and an elastic wave signal between the corrected signal start point and the corrected signal end point is determined as a valid elastic wave signal.

Figure 4:
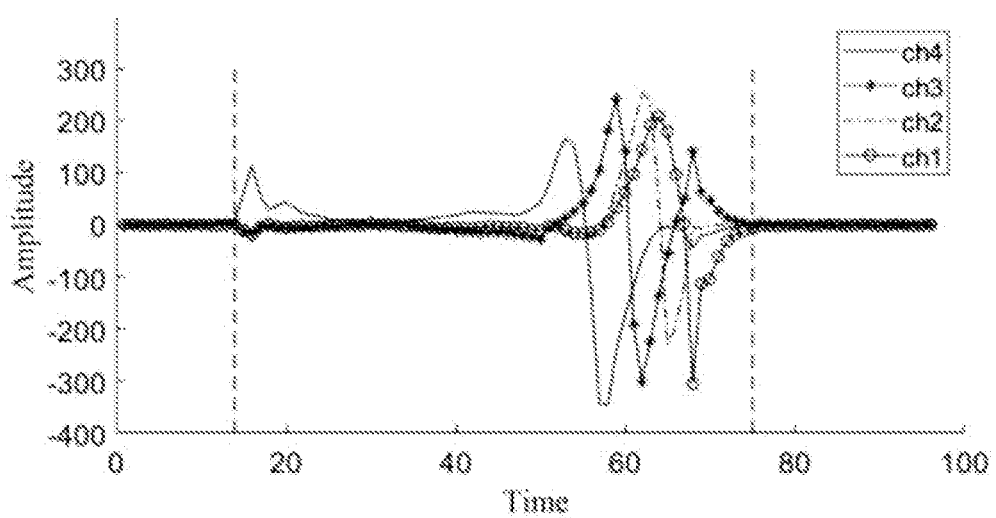
FIG. 4 is a schematic diagram of signal endpoint detection according to an exemplary embodiment of the present disclosure.
Figure 5:
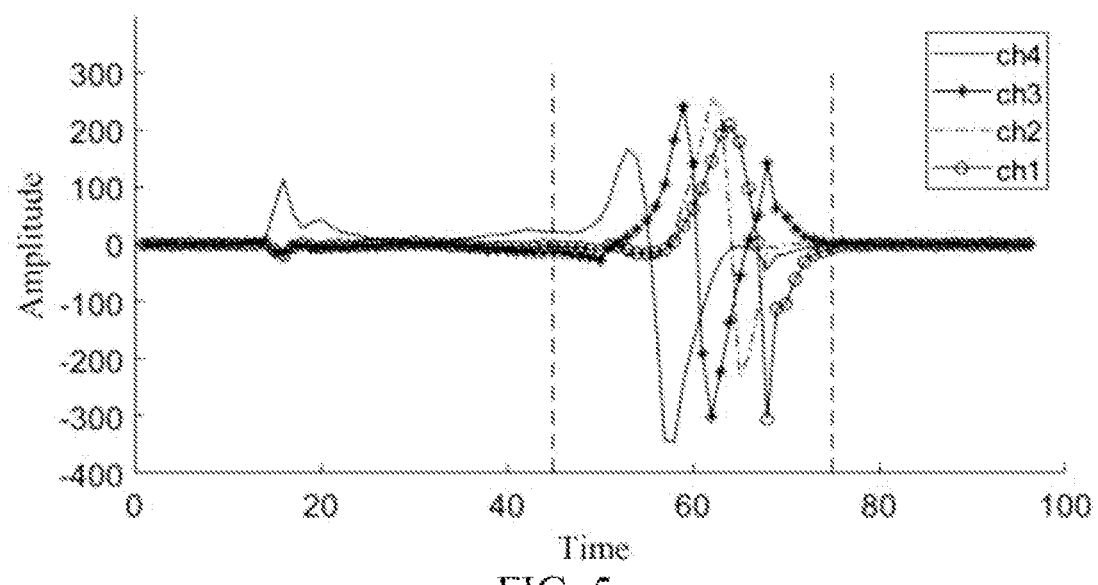
FIG. 5 is a schematic diagram of signal endpoint correction according to an exemplary embodiment of the present disclosure.

In one example, taking four elastic wave sensors disposed as an example, FIG. 4 is a schematic diagram of signal endpoint detection according to an exemplary embodiment of the present disclosure, and FIG. 5 is a schematic diagram of signal endpoint correction according to an exemplary embodiment of the present disclosure. As shown in FIGS. 4 and 5, elastic wave signals corresponding to the four elastic wave sensors are ch1, ch2, ch3, and ch4, respectively, and a signal start point and a signal end point may be determined and corrected according to the elastic wave signals ch1, ch2, ch3, and ch4 corresponding to the four elastic wave sensors, respectively.

In an exemplary embodiment of the present disclosure, before the performing the touch sensing according to the feature of the elastic wave signal, the method further includes: determining whether the current touch sensing is valid touch sensing according to the elastic wave signal; and performing the touch sensing according to the feature of the elastic wave signal when the current touch sensing is the valid touch sensing.

In this embodiment, before the touch sensing is performed, it may be determined whether a user's touch sensing is valid touch sensing, the valid touch sensing means that all requirements of touch sensing are met, including any one or more of following: a touch sensing position, a contact duration, whether touch sensing is standardized, whether a force reaches a threshold, etc.

The determining whether touch sensing is valid touch sensing may include, but is not limited to: whether the touch sensing is consistent with a predefined touch sensing category, and whether a touch position of the touch sensing (i.e., the aforementioned touch position) is within a predefined valid touch region. For example, the predefined touch sensing category is short pressing, and if a hand presses for a long time, it is invalid touch sensing. Or, if the predefined valid touch region is in the middle of a display screen, if a hand touches at an edge position of the display screen, it is invalid touch sensing.

In an example, the determining whether the touch sensing is valid touch sensing according to the elastic wave signal may include: determining a position where a hand touches the touch sensing apparatus according to a position of an elastic wave sensor which detects the elastic wave signal, determining the touch sensing is valid touch sensing when the position where the hand touches the touch sensing apparatus is in a set region, and determining the touch sensing is invalid touch sensing when the position where the band touches the touch sensing apparatus is not in the set region.

In this embodiment, according to the position of the elastic wave sensor corresponding to the elastic wave signal, whether a touch position of the hand is within a predefined valid touch region may be determined, so as to determine whether the touch sensing is valid touch sensing.

When the position of the elastic wave sensor corresponding to the elastic wave signal is within the predefined valid touch region, it is determined that the position where the hand touches the touch sensing apparatus is in the set region, thereby it is determined that the touch sensing is valid touch sensing. When the position of the elastic wave sensor corresponding to the elastic wave signal is not within the predefined valid touch region, it is determined that the position where the hand touches the touch sensing apparatus is not in the set region, thereby it is determined that the touch sensing is invalid touch sensing.

In an example, the determining whether the touch sensing is valid touch sensing according to the elastic wave signal may include: determining a time length of touching the touch sensing apparatus by the hand according to a time length of the elastic wave signal, determining that the touch sensing is valid touch sensing when the time length of touching the touch sensing apparatus by the hand is greater than or equal to a set time length, and determining that the touch sensing is invalid touch sensing when the time length of touching the touch sensing apparatus by the hand is less than the set time length.

In this embodiment, whether the touch sensing is valid trigger may be determined according to the time length of the elastic wave signal, thereby it is determined whether the touch sensing is valid touch sensing.

When the time length of the elastic wave signal is greater than or equal to the set time length, it is determined that touch sensing of the hand on the touch sensing apparatus is valid touch sensing, thereby it is determined that the touch sensing is valid touch sensing and touch sensing misrecognition is avoided when a user mistakenly triggers the touch sensing apparatus for a short time. When the time length of the elastic wave signal is less than the set time length, it is determined that the touch sensing of the hand on the touch sensing apparatus is invalid touch sensing, thereby it is determined that the touch sensing is invalid touch sensing.

In an example, an existing solution may be adopted for a method for determining whether a gesture is valid touch sensing, such as using Convolutional Neural Networks (CNN) to perform binary classification, and in the binary classification, valid touch sensing and invalid touch sensing are divided to recognize whether touch sensing is valid touch sensing or invalid touch sensing.

Figure 6:
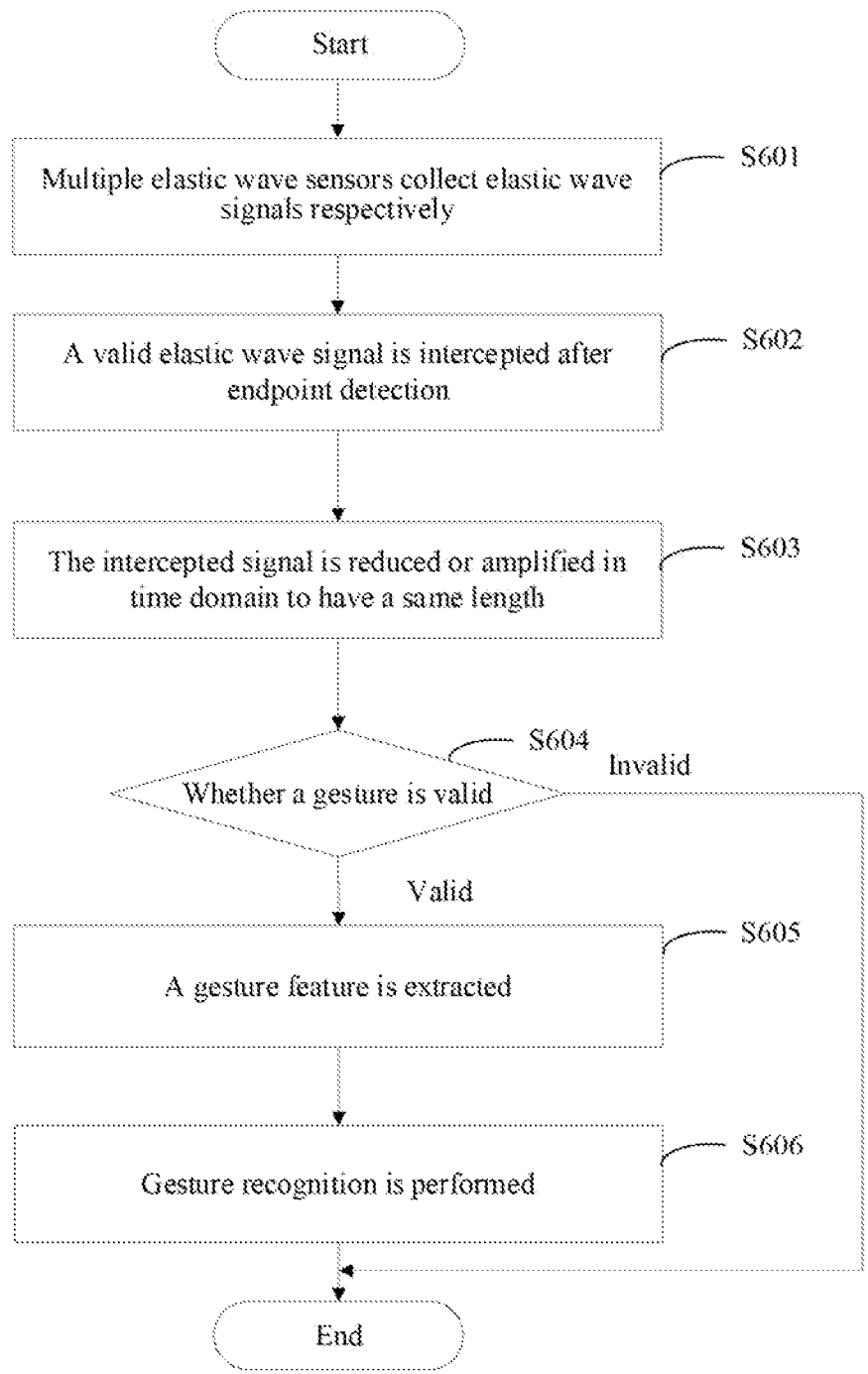
FIG. 6 is a flowchart of a touch sensing method according to another exemplary embodiment of the present disclosure.

FIG. 6 is a flowchart of a touch sensing method according to another exemplary embodiment of the present disclosure, and as shown in FIG. 6, the touch sensing method may include S601 to S606.

S601: multiple elastic wave sensors collecting elastic wave signals respectively.

In this embodiment, multiple elastic wave sensors may be disposed at different positions, and elastic wave signals generated when a hand touches a display screen are respectively collected or detected by the multiple elastic wave sensors.

S602: intercepting a valid elastic wave signal after endpoint detection.

According to the endpoint detection of any of the above embodiments, after determining a signal start point and a signal end point, an elastic wave signal between the signal start point and the signal end point is intercepted as a valid elastic wave signal.

The signal start point may include a corrected signal start point, and the signal end point may include a corrected signal end point.

S603: reducing or amplifying the intercepted signal in time domain to have a same length.

Different gestures, different user operation habits, and other factors, will lead to different durations of touch sensing signals. In order to facilitate touch sensing, an intercepted signal may be reduced or amplified in the time domain to have a same length, and an obtained valid elastic wave signal is a*b, wherein a is a signal length (preset length) of each valid elastic wave signal, b is a quantity of elastic wave sensors, and b is greater than or equal to 1.

When a length of the intercepted signal is larger than a preset length, signal sampling is performed to obtain a valid elastic wave signal with the preset length; when the length of the intercepted signal is less than the preset length, signal interpolation is performed to obtain a valid elastic wave signal with the preset length.

S604: determining whether touch sensing is valid, and if the touch sensing is valid, S605 is executed; if the touch sensing is invalid, it ends.

Before touch sensing is performed, it may be first determined whether a user's touch sensing is valid or not. In this example, valid touch sensing refers to meeting all requirements of touch sensing, including a touch sensing position, a contact duration, whether a gesture is standardized, whether a force reaches a threshold, etc.

For determining whether the touch sensing is valid touch sensing, please refer to the method for determining valid touch sensing shown in any of the above embodiments, which will not be repeated here in this embodiment.

S605: extracting a touch sensing feature.

S606: performing touch sensing.

In S605 and S606, a touch sensing feature may be extracted based on a valid elastic wave signal corresponding to each elastic wave sensor, and the touch sensing feature may include a synchronous feature or an asynchronous feature, and it is recognized whether touch sensing is taping or sliding according to whether there is a synchronous feature or asynchronous feature between multiple valid elastic wave signals corresponding to multiple elastic wave sensors. touch sensing may refer to extraction of a touch sensing feature and touch sensing shown in any of the above embodiments, which will not be repeated here in this embodiment.

Figure 7:
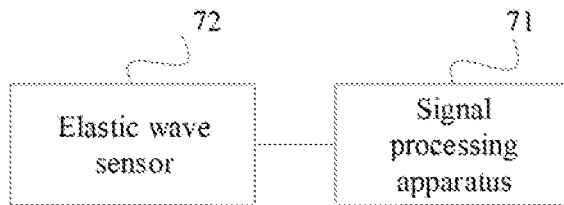
FIG. 7 is a structural block diagram of a touch sensing apparatus according to an exemplary embodiment of the present disclosure.

FIG. 7 is a structural block diagram of a touch sensing apparatus according to an exemplary embodiment of the present disclosure. As shown in FIG. 7, the touch sensing apparatus may include a signal processing apparatus 71 and at least one elastic wave sensor 72, and the signal processing apparatus may be electrically connected with each elastic wave sensor.

The signal processing apparatus may include a memory and a processor. The memory is used for storing execution instructions, and the processor may be a Central Processing Unit (CPU), or an Application Specific Integrated Circuit (ASIC), or one or more integrated circuits for completing implementations of the embodiments of the present invention.

When the signal processing apparatus is running, the processor communicates with the memory, and the processor invokes execution instructions for performing following operations: acquiring an elastic wave signal detected by at least one elastic wave sensor disposed on a touch sensing apparatus; determining the feature of the elastic wave signal, wherein the feature may include: a synchronous feature, an asynchronous feature, or a preset tap waveform feature of touch sensing; and performing touch sensing according to the feature of the elastic wave signal.

The signal processing apparatus according to the embodiments of the present disclosure is configured to execute a technical solution of the touch sensing method of any embodiment, and its implementation principle and implementation effect are similar, which will not be repeated here.

In an exemplary embodiment of the present disclosure, a quantity of the elastic wave sensors may be multiple, and the processor performs touch sensing according to the feature of the elastic wave signal, which may include: when multiple elastic wave signals corresponding to multiple elastic wave sensors have a synchronous feature, current touch sensing is recognized as taping; and when multiple elastic wave signals corresponding to multiple elastic wave sensors have an asynchronous feature, the current touch sensing is recognized as sliding; wherein the synchronization feature means that a phase difference between the multiple elastic wave signals is less than or equal to a preset time difference, and a phase difference between peaks or troughs of the multiple elastic wave signals is less than or equal to the preset time difference; the asynchronous feature means that the phase difference of the peaks or troughs of the multiple elastic wave signals is larger than the preset time difference and multiple elastic wave signals will not intersect at a same time point in the process of touch sensing.

In an exemplary embodiment of the present disclosure, the processor is further configured to: acquire multiple touch sensing results within preset time after the current touch sensing is recognized as taping; determine that the taping is single taping when there is only one taping in touch sensing results of multiple consecutive detection periods within the preset time; and determine that taps are D taps when touch sensing results of D consecutive detection periods are all taps within the preset time, wherein D is greater than or equal to 2.

In an exemplary embodiment of the present disclosure, the processor is further configured to: after the current touch sensing is recognized as taping, determine that the taping is pressing for a predefined time when a time length of any valid elastic wave signal is greater than or equal to a first pressing time threshold; or, after the current touch sensing is recognized as taping, determine a time length of each of multiple elastic wave signals, and determine the taping as pressing for a predefined time when a maximum time length of the multiple elastic wave signals is greater than or equal to a second pressing time threshold.

In an exemplary embodiment of the present disclosure, the processor is further configured to: after the current touch sensing is recognized as sliding, determine a direction of the sliding according to positions where multiple elastic wave sensors corresponding to multiple elastic wave signals with peaks or troughs appearing successively are located: determine that the direction of the sliding is from a first position to a second position when a position where an elastic wave sensor corresponding to an elastic wave signal with an earliest peak or trough is located is the first position and a position where an elastic wave sensor corresponding to an elastic wave signal with a latest peak or trough is located is the second position.

In an exemplary embodiment of the present disclosure, a quantity of the elastic wave sensor(s) may be one, and the processor performs touch sensing according to the feature of the elastic wave signal, which may include: when a waveform of the elastic wave signal is a preset tap touch sensing waveform, the current touch sensing is determined as taping.

In an exemplary embodiment of the present disclosure, the processor is further configured to determine a valid elastic wave signal after the elastic wave signal is acquired.

The processor determines the valid elastic wave signal, which may include: a signal start point and a signal end point of touching the touch sensing apparatus by a band in the elastic wave signal are determined according to an amplitude of the elastic wave signal; the processor determines the signal start point and the signal end point of the hand touching the touch sensing apparatus in the elastic wave signal according to the amplitude of the elastic wave signal, which may include: the signal start point and the signal end point are determined according to an amplitude of one elastic wave signal, a minimum time point corresponding to an amplitude whose absolute value of the elastic wave signal is greater than a first threshold is taken as the signal start point, and a minimum time point corresponding to an amplitude whose absolute value of the elastic wave signal is smaller than a second threshold is taken as the signal end point; or, the signal start point and the signal end point are determined according to amplitudes of multiple elastic wave signals, a cumulative value of absolute values of amplitudes of multiple elastic wave signals at a same time point is acquired, a minimum time point corresponding to a cumulative value larger than a third threshold is taken as the signal start point, and a minimum time point corresponding to a cumulative value smaller than a fourth threshold is taken as the signal end point: or, the signal start point and the signal end point are determined according to amplitudes of multiple elastic wave signals, a cumulative average value of absolute values of amplitudes of multiple elastic wave signals at a same time point is acquired, a minimum time point corresponding to a cumulative average value larger than a fifth threshold is taken as the signal start point, and a minimum time point corresponding to a cumulative average value smaller than a sixth threshold is taken as the signal end point.

In an exemplary embodiment of the present disclosure, the processor is further configured to: correct the signal start point and the signal end point after the signal start point and the signal end point of touching the touch sensing apparatus by the band in the elastic wave signal are determined according to the amplitude of the elastic wave signal: determine a position of a maximum amplitude between the signal start point and the signal end point, take the position as a center to respectively extend to both ends of the signal, find a left position and a right position respectively where a difference between two adjacent amplitudes is less than a difference threshold, and take the left position as a corrected signal start point and take the right position as a corrected signal end point; the signal start point includes a corrected signal start point, and the signal end point includes a corrected signal end point.

In an exemplary embodiment of the present disclosure, the processor determines the valid elastic wave signal, which may further include: an elastic wave signal between the signal start point and the signal end point is intercepted, and the intercepted signal is reduced or amplified in time domain to obtain a valid elastic wave signal with a preset length; or, an elastic wave signal between the signal start point and the signal end point is intercepted and the intercepted signal is taken as a valid elastic wave signal.

In an exemplary embodiment of the present disclosure, the processor is further configured to: determine whether the touch sensing is valid touch sensing according to the elastic wave signal before touch sensing is performed according to the feature of the elastic wave signal, and perform touch sensing according to the feature of the elastic wave signal when the touch sensing is the valid touch sensing.

In an exemplary embodiment of the present disclosure, the processor determines whether the touch sensing is valid touch sensing according to the elastic wave signal, which may include: determine a position where a hand touches the touch sensing apparatus according to a position of an elastic wave sensor which detects the elastic wave signal, determine that the touch sensing is valid touch sensing when the position where the band touches the touch sensing apparatus is in a set region, and determine that the touch sensing is invalid touch sensing when the position where the hand touches the touch sensing apparatus is not in the set region; or, determine a time length of touching the touch sensing apparatus by the hand according to a time length of the elastic wave signal, determine that the touch sensing is valid touch sensing when the time length of the hand touching the touch sensing apparatus is greater than or equal to a set time length, and determine that the touch sensing is invalid touch sensing when the time length of the hand touching the touch sensing apparatus is less than the set time length.

Figure 8:
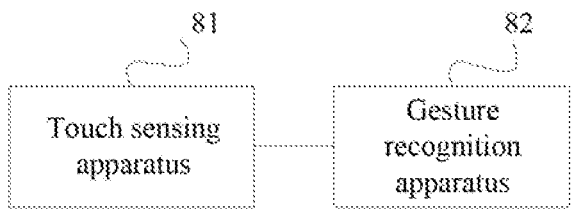
FIG. 8 is a structural block diagram of a terminal device according to an exemplary embodiment of the present disclosure.

FIG. 8 is a structural block diagram of a terminal device according to an exemplary embodiment of the present disclosure. As shown in FIG. 8, the terminal device may include a touch sensing apparatus 81 and the touch sensing apparatus 82 shown in any embodiment, and the touch sensing apparatus may include a display screen.

The touch sensing apparatus may be applied to the terminal device to recognize a touch sensing operation of a user on the display screen of the terminal device and improve human-computer interaction experience of the user.

Figure 9:
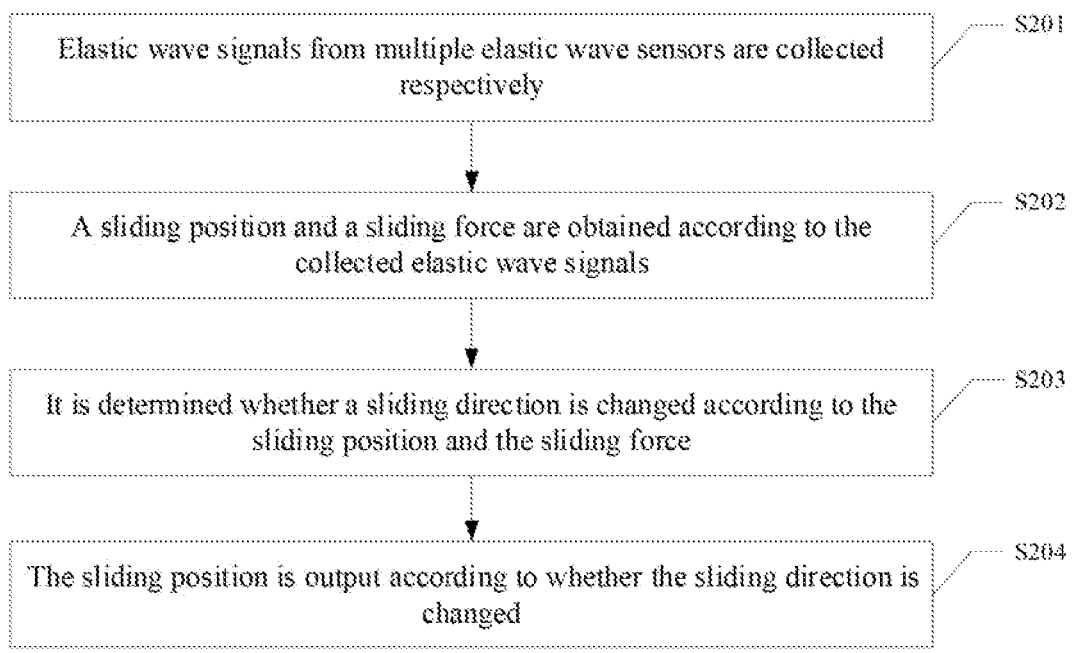
FIG. 9 is a flowchart of a sliding positioning method according to an embodiment of the present disclosure.

FIG. 9 shows a sliding positioning method, as shown in FIG. 9, the method includes following steps.

S201: collecting elastic wave signals from multiple elastic wave sensors.

FIG. 10 shows a schematic diagram of a touch screen provided with multiple elastic wave sensors, and four elastic wave sensors are mounted on a back surface of the touch screen in a staggered way; such sensors with a staggered arrangement may increase signal amount in the middle, which is beneficial to precise positioning of writing. FIG. 10 is illustrated by taking only four elastic wave sensors as an example, and in other embodiments, two, or three, or more than four elastic wave sensors may be provided, which is not limited herein.

S202: obtaining a sliding position and a sliding force according to the collected elastic wave signals.

S203: determining whether a sliding direction is changed according to the sliding position and the sliding force.

S204: outputting the sliding position according to whether the sliding direction is changed.

In this embodiment of the present disclosure, a factor of the sliding force is added into consideration during sliding positioning, whether the sliding direction is changed is determined according to the sliding position and the sliding force, and the sliding position is output according to a change of the sliding direction, so that the output sliding position can reflect the change of the sliding direction in time, and accuracy of sliding positioning is improved.

The sliding positioning method shown in FIG. 9 may be performed independently or may be combined with the touch sensing method shown in FIG. 1. When combined with the touch sensing method, after the sliding direction is determined, the above steps S202 and S203 may be adopted to determine whether the sliding direction is changed or not.

In an exemplary embodiment, after the step S101 of FIG. 1, i.e., after the elastic wave signal from the elastic wave sensor is collected, the method may further include: determining whether interaction is started or not based on the collected elastic wave signal. It may be determined in a following way: calculating an absolute change and a relative change of elastic wave signal amplitude according to an elastic wave signal collected at a current moment and an elastic wave signal collected at a previous moment: determining whether at least one kind of changes is greater than an interaction threshold set for the elastic wave signal, and if at least one kind of the changes is greater than the interaction threshold set for the elastic wave signal, it is determined that interaction is started. Through interactive judgment, a non-sliding operation may be ruled out.

In an exemplary embodiment, the absolute change of the elastic wave signal includes one or more of following: summing signal values of elastic wave signals from multiple elastic wave sensors collected at a current moment, and finding a maximum value of signal values of elastic wave signals from multiple elastic wave sensors collected at a current moment.

Whether the absolute change of the elastic wave signal is greater than the interaction threshold set for the elastic wave signal is determined in any one of following ways: when a result of summing the signal values is larger than a preset first interaction threshold, it is determined that the absolute change of the elastic wave signal is larger than the interaction threshold set for the elastic wave signal; when a result of finding the maximum value of the signal values is greater than a preset second interaction threshold, it is determined that the absolute change of the elastic wave signal is greater than the interaction threshold set for the elastic wave signal; when a result of summing the signal values is greater than a preset first interaction threshold and a result of finding a maximum value of the signal values is greater than a preset second interaction threshold, it is determined that the absolute change of the elastic wave signal is greater than the interaction threshold set for the elastic wave signal.

Taking four elastic wave sensors shown in FIG. 10 as an example, a method of determining an absolute change of a signal may include any one or both of following: finding a sum sum1 of signal values of elastic wave signals from multiple elastic wave sensors collected at a current moment t, $sum1=ch1(t)+ch2(t)+ch3(t)+ch4(t)$, and $ch1(t)$ to $ch4(t)$ are signal values of elastic wave signals from the four elastic wave sensors collected at the current moment t; finding a maximum value max1 of signal values of elastic wave signals from multiple elastic wave sensors collected at a current moment, max1=max(ch1(*t*), ch2(*t*), ch3(*t*), ch4(*t*)).

Determining whether the absolute change of the elastic wave signal is greater than the interaction threshold set therefor includes any one of the following: when sum1 is used for describing the absolute change of the signal, if sum1 is greater than the preset first interaction threshold, it is determined that the absolute change of the elastic wave signal is greater than the interaction threshold set for the elastic wave signal; when max1 is used for describing the absolute change of the signal, if max1 is greater than the preset second interaction threshold, it is determined that the absolute change of the elastic wave signal is greater than the interaction threshold set for the elastic wave signal; when sum1 and max1 are used for describing the absolute change of the signal, if sum1 is greater than the preset first interaction threshold and max1 is greater than the preset second interaction threshold, it is determined that the absolute change of the elastic wave signal is greater than the interaction threshold set for the elastic wave signal.

In an exemplary embodiment, a manner of determining the relative change of the elastic wave signal includes: calculating a difference value between a signal value of an elastic wave signal collected at a current moment and a signal value of an elastic wave signal collected at a previous moment for a collected elastic wave signal from each elastic wave sensor; after multiple difference values are calculated according to collected elastic wave signals from multiple elastic wave sensors, determining a maximum value of the multiple difference values.

Determining whether the relative change of the elastic wave signal is greater than the interaction threshold set for the elastic wave signal includes: determining that the relative change of the elastic wave signal is greater than the interaction threshold set for the elastic wave signal when the maximum value of the multiple difference values is greater than an interaction threshold set for the elastic wave signal.

Taking the four elastic wave sensors shown in FIG. 10 as an example, a manner of determining an absolute change of a signal may include: calculating a difference value diffCh of a signal value of an elastic wave signal collected at a current moment t and a signal value of an elastic wave signal collected at a previous moment t1 for a collected elastic wave signal from each elastic wave sensor to obtain diffCh1=ch1(*t*)-ch1(*t*1), diffCh2=ch2(*t*)-ch2(*t*1), diffCh3=ch3(*t*)-ch3(*t*1), diffCh4=ch4(*t*)-ch4(*t*1); ch1(*t*) to ch4(*t*) are signal values of elastic wave signals from the four elastic wave sensors collected at the current moment t, ch1(*t*1) to ch4(*t*1) are signal values of elastic wave signals from the four elastic wave sensors collected at the previous moment t1, and diffCh1 to diffCh4 are difference values calculated according to elastic wave signals of the four elastic wave sensors; determining a maximum value of diffCh1 to diffCh4, namely max(diffCh1, diffCh3, diffCh3, diffCh4); determining whether the relative change of the elastic wave signal is greater than the interaction threshold set for the elastic wave signal, includes: determining that the relative change of the elastic wave signal is larger than the interaction threshold set therefor when max (diffCh1, diffCh3, diffCh3, diffCh4) is larger than a interaction threshold preset for the elastic wave signal.

As an exemplary embodiment, the above step S202 may be implemented in a following manner:

S2021: obtaining a preliminary positioned sliding position according to a collected elastic wave signal, and obtaining a sliding speed according to the preliminary positioned sliding position;

S2022: selecting a filtering mode according to the sliding speed to filter an elastic wave signal output by each elastic wave sensor after collecting elastic wave signals from multiple elastic wave sensors;

S2023: obtaining an accurately positioned sliding position and a sliding force according to a filtered elastic wave signal.

There is a case in which elastic wave signals output from elastic wave sensors may have larger data fluctuation. According to the embodiment of the present disclosure, high-precision positioning may be further achieved by filtering the elastic wave signal output from each elastic wave sensor to smooth the elastic wave signal.

In an exemplary embodiment, the obtaining the sliding speed according to the preliminarily positioned sliding position in the above step S2021, includes: determining an average sliding speed v according to a preliminarily positioned sliding position p at a current moment t and an accurately positioned sliding position p1 at a previous moment t1;

$$v = \frac{\Delta p}{\Delta t} = \frac{p - p1}{t - t1},$$

setting an initial moment, t1=0; obtaining a sliding speed V at the current moment t (the sliding speed at the current moment t is a calibrated sliding speed) according to the average sliding speed v and a sliding speed V1 obtained at the previous moment t1; V=V1*β+v*(1−β), setting an initial moment, V1=0; among them, β is a calibration coefficient or a weight for the sliding speed, and the weight β represents a degree of influence of the sliding speed at the previous moment t1 on the sliding speed V at the current moment t; in a practical situation, a change of speed is slow relative to a collection frequency, so β may be set to be a larger value, such as β≥0.7. A sliding speed may be calibrated through a formula V=V1*β+v*(1−β) to prevent the sliding speed from fluctuating up and down, so that a calculated sliding speed is closer to an actual sliding speed.

Figure 11:
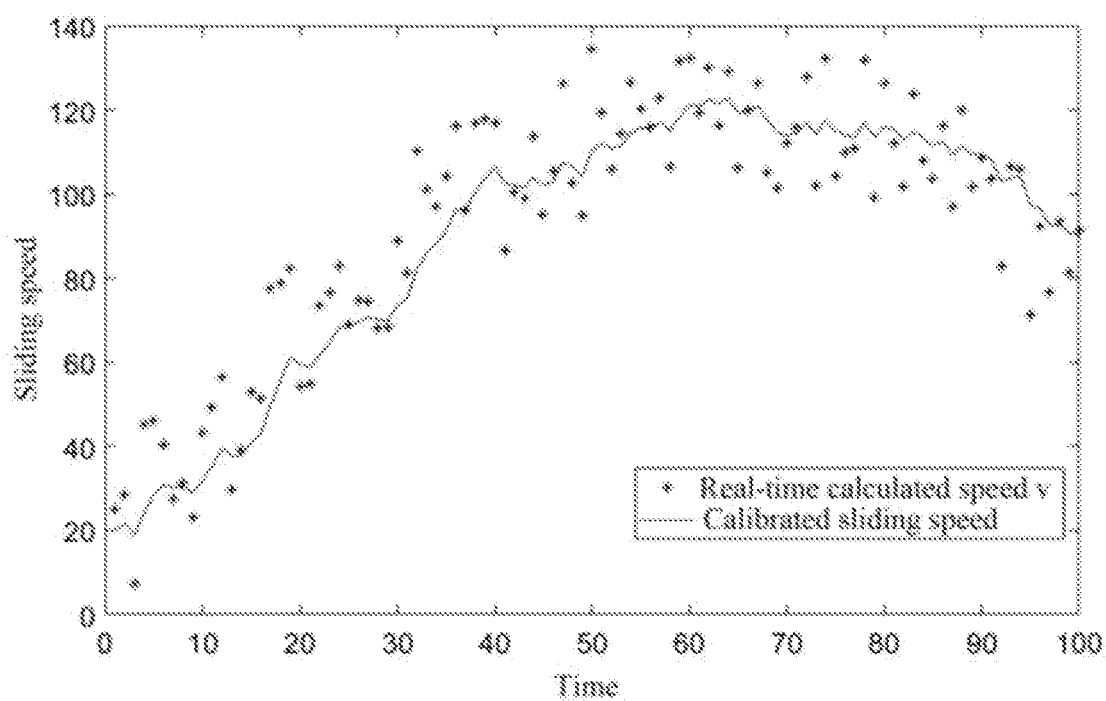
FIG. 11 is a comparison diagram between a calibrated sliding speed calculated according to a method described in an embodiment of the present disclosure and a real-time sliding speed calculated according to a solution of the prior art.

FIG. 11 shows a comparison diagram of a calibrated sliding speed calculated according to the method described in an embodiment of the present disclosure and an uncalibrated real-time sliding speed. As may be seen in FIG. 11, an up-down fluctuation degree of the uncalibrated real-time sliding speed is obviously greater than an up-down fluctuation degree of the calibrated sliding speed.

In an exemplary embodiment, the selecting the filtering mode according to the sliding speed to filter the elastic wave signal output by each elastic wave sensor in the step S2022, includes: selecting filters with different filter window lengths according to a sliding speed at a current moment to filter the elastic wave signal output by each elastic wave sensor when a collection frequency is less than a preset frequency threshold; selecting filters with different frequencies according to the sliding speed at the current moment to filter the elastic wave signal output by each elastic wave sensor when a collection frequency is equal to or greater than the preset frequency threshold.

In an exemplary embodiment, the selecting the filters with different filter window lengths according to the sliding speed at the current moment to filter the elastic wave signal output by each elastic wave sensor when the collection frequency is less than the preset frequency threshold includes: selecting a filter window length according to a preset speed interval where the sliding speed at the current moment is located and an obtained corresponding relationship between a preset sliding speed interval and a filter window length, wherein the larger the sliding speed is, the shorter the corresponding filter window length is. The filter window length refers to a size of a filter window.

Figure 12A:
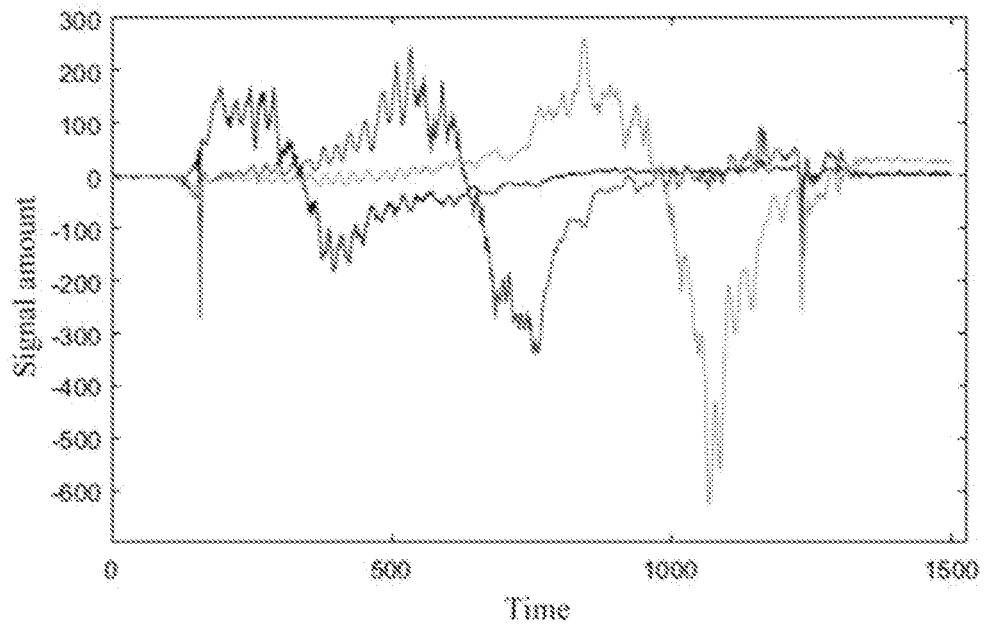
FIG. 12A and FIG. 12B are schematic diagrams of influences of different sliding speeds on an elastic wave signal output by an elastic wave sensor according to embodiments of the present disclosure.
Figure 12B:
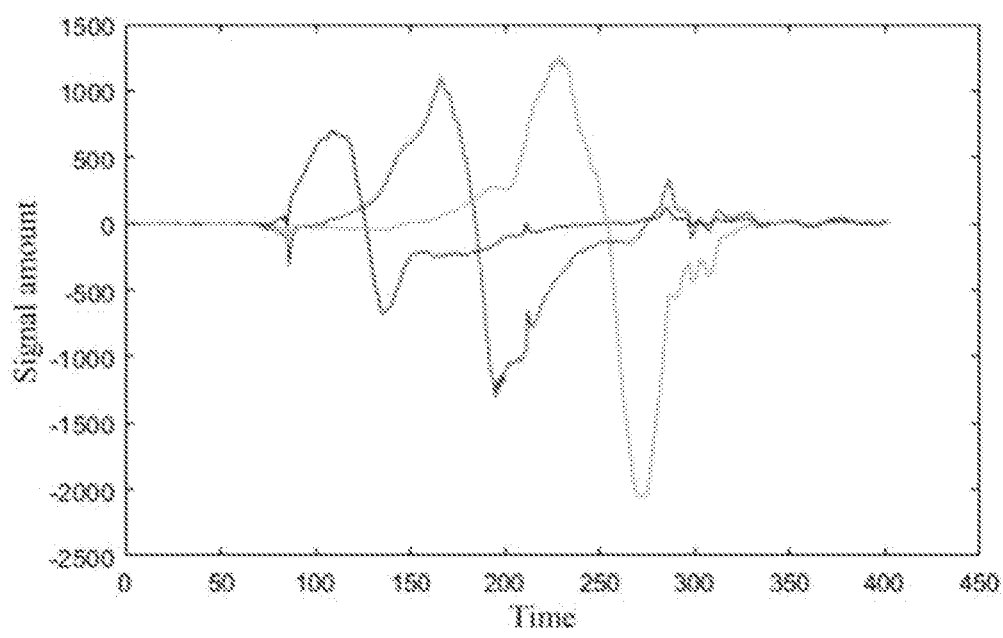

FIG. 12A and FIG. 12B show influences of different sliding speeds on an elastic wave signal output by an elastic wave sensor. FIG. 12A is an elastic wave signal output by an elastic wave sensor under slow sliding, and FIG. 12B is an elastic wave signal output by an elastic wave sensor under fast sliding. Fluctuation of a waveform of the elastic wave signal output by the elastic wave sensor under slow sliding is large, while fluctuation of a waveform of the elastic wave signal output by the elastic wave sensor under fast sliding is small. For a signal with large fluctuation, a longer filter window length needs to be used for smoothing, otherwise a smoothing effect is poor and positioning accuracy is affected adversely.

In an exemplary embodiment, a following method is adopted to obtain the corresponding relationship between the preset sliding speed interval and the filter window length: in a case of randomly selecting a speed $V_x$ in each preset sliding speed interval for sliding, performing filtering on collected M elastic wave signals output by any elastic wave sensor using filter window lengths with different preset lengths, and a smoothing index K is calculated according to the filtered M elastic wave signals;

$$K = \frac{\sum_{n=1}^{M}[f(n)-f(n-1)]^2}{n-1} * \frac{1}{V_x},$$

among them, f(n) is a filtered n-th collected elastic wave signal value after filtering, f(n−1) is a filtered (n−1)-th collected elastic wave signal value, n∈ M, M is a quantity of elastic wave signals, M is a positive integer greater than or equal to 2; a smoothing index K which is smaller than a preset smoothness threshold and has a smallest value is selected from multiple smoothing indexes K obtained according to the filter window lengths with the different preset lengths, and a filter window length corresponding to a selected smoothing index K is taken as a filter window length corresponding to a sliding speed interval where $V_x$ is located.

It is assumed that there are three preset sliding speed intervals, which are respectively less than or equal to a low-speed threshold, greater than the low-speed threshold and less than a high-speed threshold, greater than or equal to the high-speed threshold; filter window lengths, selected through a smoothing index, suitable for the three sliding speed intervals are respectively 4, 8, and 16, and in a filter window length, time or a quantity of sampling points is taken as a scale, wherein a filter window length corresponding to a sliding speed interval less than the low-speed threshold is 16, which aims to make an elastic wave signal smoother and reduce an influence of fluctuation characteristics of the elastic wave signal on a positioning result; a filter window length corresponding to a sliding speed interval greater than the low-speed threshold and less than the high-speed threshold is 8; a filter window length corresponding to a sliding speed interval greater than or equal to the high-speed threshold is 4, which aims to preserve characteristics of original data as much as possible and be able to filter out signal mutation.

Figure 13:
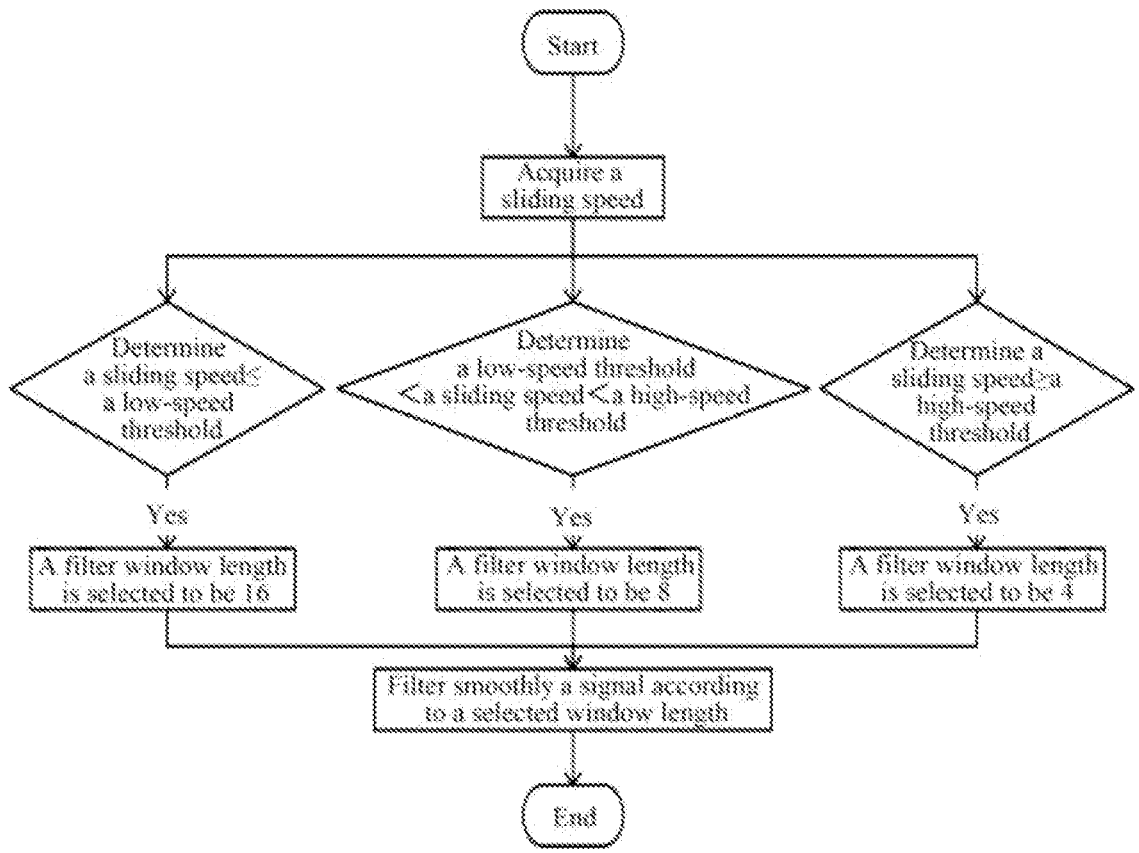
FIG. 13 is a schematic diagram of selecting a filter window length according to a corresponding relationship between a preset sliding speed interval and a filter window length according to an embodiment of the present disclosure.

When a sliding speed at a current moment is acquired, a preset speed interval where the sliding speed at the current moment is located is determined, and a process of selecting a filter window length according to a corresponding relationship between a preset sliding speed interval and a filter window length may be as shown in FIG. 13.

In an exemplary embodiment, the selecting the filters with the different frequencies according to the sliding speed at the current moment to filter the elastic wave signal output by each elastic wave sensor when the collection frequency is equal to or greater than the preset frequency threshold includes: selecting a high-pass filter to filter the elastic wave signal output by each elastic wave sensor when the sliding speed at the current moment is greater than the preset speed threshold, because when the sliding speed is faster, a high frequency feature of the elastic wave signal is obvious; selecting a low-pass filter to filter the elastic wave signal output by each elastic wave sensor when the sliding speed at the current moment is less than or equal to the preset speed threshold, because when the sliding speed is slower, a low frequency signal of the elastic wave signal is larger and its feature is obvious.

In an exemplary embodiment, the determining whether the sliding direction is changed according to the sliding position and the sliding force of the step S203 includes: determining a historical sliding direction according to a historical sliding position, and determining a position change direction according to a sliding position at a current moment and a sliding position at a previous moment, and determining that the sliding direction is not changed if the position change direction is consistent with the historical sliding direction; determining that the sliding direction is changed if the position change direction is inconsistent with the historical sliding direction.

The above method for determining the historical sliding direction according to the historical sliding position may refer to related technologies, for example, an average sliding direction may be generated according to a path fitting function formed by the historical sliding position, and the average sliding direction is the historical sliding direction.

In an exemplary embodiment, a following method may be adopted to determine whether the position change direction is consistent with the historical sliding direction: when elastic wave sensors are arranged in series, a calculated sliding position is a one-dimensional position, then the position change direction and the historical sliding direction are each a numerical value, and whether the position change direction is consistent with the historical sliding direction may be determined by determining whether the position change direction*historical sliding direction>0 is satisfied, if the position change direction*historical sliding direction>0) is satisfied, the position change direction is consistent with the historical sliding direction; if the position change direction*historical sliding direction>0 is not satisfied, the position change direction is inconsistent with the historical sliding direction; when the elastic wave sensors are arranged in a manner other than in series, a calculated sliding position is a multi-dimensional position, then the position change direction and the historical sliding direction are a multi-dimensional vector, whether the position change direction is consistent with the historical sliding direction may be determined by determining whether an included angle between the two vectors, the position change direction and the historical sliding direction, is less than a preset angle threshold, and if the included angle is less than the preset angle threshold, it shows that the position change direction is consistent with the historical sliding direction; if the included angle is greater than or equal to the preset angle threshold, the position change direction is inconsistent with the historical sliding direction.

In an exemplary embodiment, after determining that the position change direction is inconsistent with the historical sliding direction, the method further includes: performing confidence evaluation on the sliding position at the current moment, and determining that the sliding direction is changed if a confidence evaluation value of the sliding position at the current moment is greater than a preset value. The performing the confidence evaluation on the sliding position at the current moment refers to obtaining a probability of the sliding position at the current moment, and the greater the probability, the greater the corresponding confidence evaluation value.

In an exemplary embodiment, in the step S203, before determining the historical sliding direction according to the historical sliding position, the method further includes: determining whether current touch sensing is a continuous sliding operation according to the sliding force; if the current touch sensing is a continuous sliding operation, determining whether a quantity of historical sliding positions formed by or a distance passed by the sliding operation exceeds a corresponding commutation threshold; if the quantity of the historical sliding positions formed by or the distance passed by the sliding operation exceeds the corresponding commutation threshold, performing the step of determining the historical sliding direction according to the historical sliding position; if the quantity of the historical sliding positions formed by or the distance passed by the sliding operation does not exceed the corresponding commutation threshold, determining that the sliding direction is not changed: if the current touch sensing is not a continuous sliding operation, performing the step of determining the historical sliding direction according to the historical sliding position.

For example, a volume is adjusted by sliding up and down on a touch sensing panel. According to behavior statistics of a user, it is known that when sliding up continuously, if a sliding distance passed by a historical sliding position is less than 3 mm, the user will not slide down again in a practical application, and the 3 mm is a commutation threshold.

In an exemplary embodiment, a following method may be adopted to determine whether the current touch sensing is a continuous sliding operation according to the sliding force: determining whether a relationship between a sliding force and sliding time conforms to a preset force release function, and if the relationship between the sliding force and the sliding time conforms to the preset force release function, the current touch sensing is not a continuous sliding operation. When the relationship between the sliding force and the sliding time conforms to the force release function, it means that it is in a process of ending interaction, that is, it is not a continuous sliding operation.

In another exemplary embodiment, considering that it is also possible to determine that the relationship between the sliding force and the sliding time conforms to the preset force release function under a continuous sliding operation due to influences of various factors such as hardware or a user gesture when the sliding force is larger, therefore, determining whether the current touch sensing is a continuous sliding operation according to the sliding force includes: determining whether a sliding force at a current moment is less than a stored local peak force, and if the sliding force at the current moment is less than the stored local peak force, determining whether an absolute value of a difference value between the sliding force at the current moment and a sliding force at a previous moment is less than or equal to a force change threshold; and determining whether the relationship between the sliding force and the sliding time conforms to the preset force release function; when the absolute value of the difference value between the sliding force at the current moment and the sliding force at the previous moment is greater than the force change threshold, or the relationship between the sliding force and the sliding time does not conform to the preset force release function, determining that the current touch sensing is a continuous sliding operation; when the absolute value of the difference value between the sliding force at the current moment and the sliding force at the previous moment is less than or equal to the force change threshold, and the relationship between the sliding force and the sliding time conforms to the preset force release function, determining that it is not a continuous sliding operation.

In an exemplary embodiment, the force release function may be $y=A*e^{-Kt}$; among them, A and K are fixed constants determined according to hardware parameters of the elastic wave sensors, t is time, and y is a sliding force.

In an exemplary embodiment, the force change threshold is a local peak force with a preset proportion; the preset proportion is generally recommended to be in a range of 0 to 50%, such as 30%; and the smaller the value selected for the preset proportion is, the stricter the determination condition is.

In an exemplary embodiment, if a sliding force at a current moment is determined to be greater than or equal to a stored local peak force, a continuous sliding operation is directly determined, and the sliding force at the current moment is updated as the stored local peak force.

Figure 14:
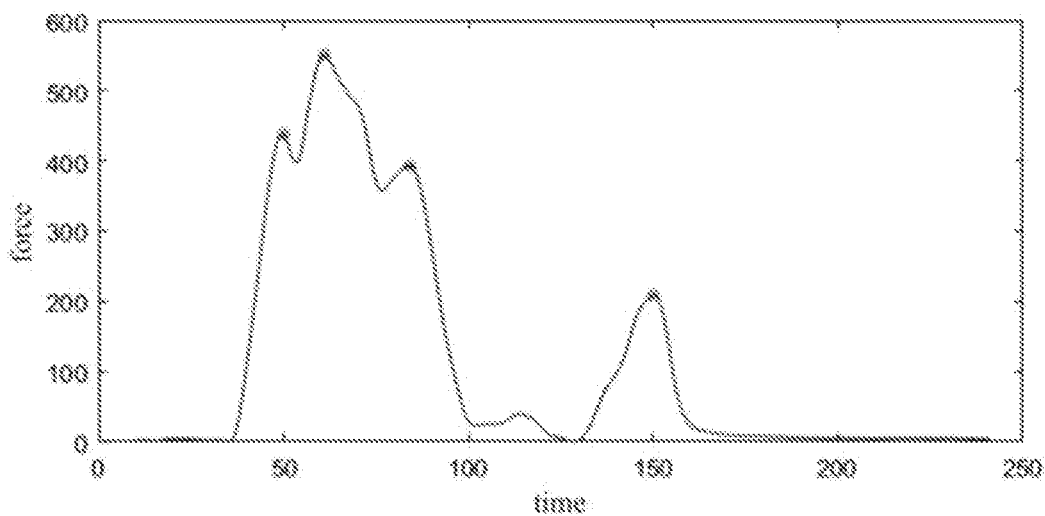
FIG. 14 is a schematic diagram of a change process of a sliding force relative to time in one bidirectional sliding operation according to an embodiment of the present disclosure.

FIG. 14 shows a change process of a sliding force relative to time in a bidirectional sliding operation, and force values marked by dots obtained in time sequence in the figure are local peak forces stored in turn.

Figure 15:
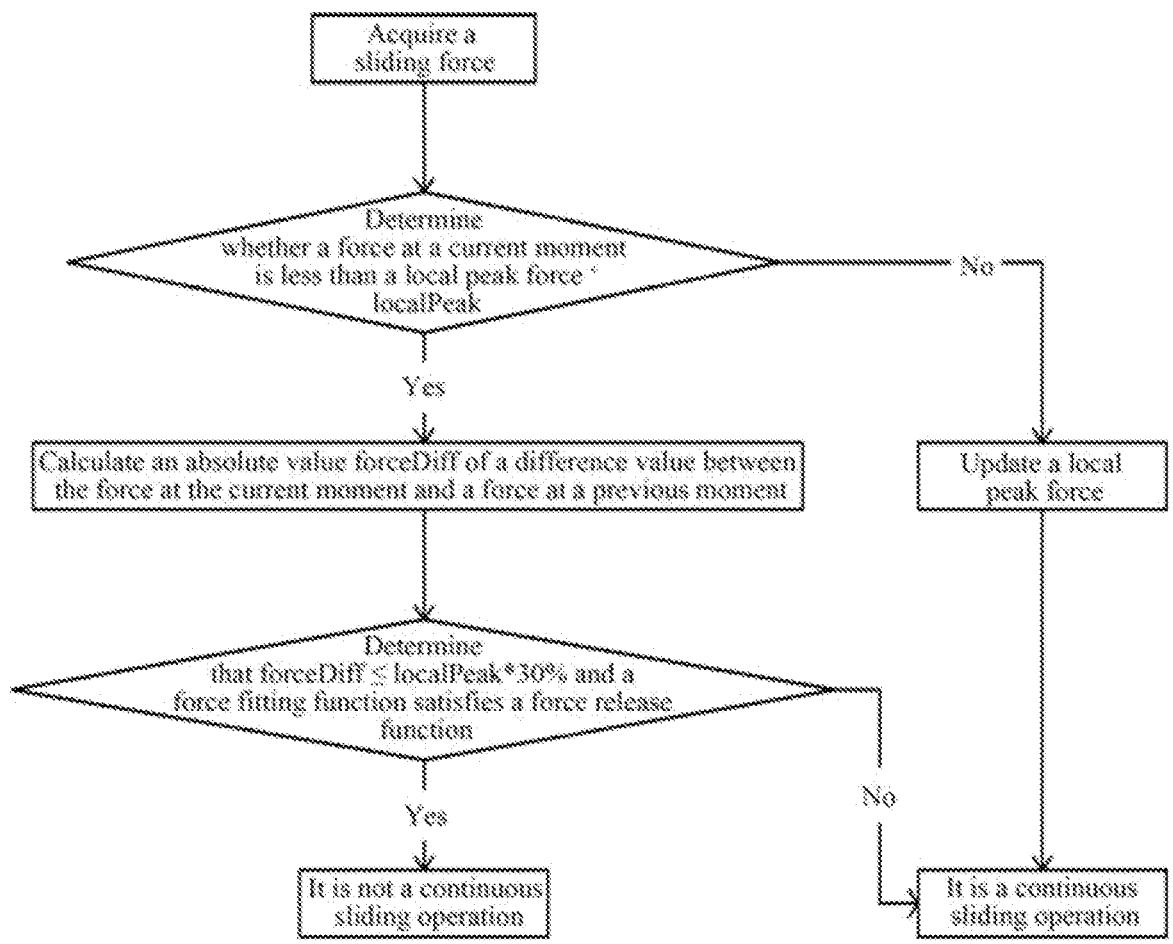
FIG. 15 is an example diagram of a method for determining a continuous sliding operation according to an embodiment of the present disclosure.

FIG. 15 is an example diagram of a method for determining a continuous sliding operation according to the above embodiment.

In an exemplary embodiment, the outputting the sliding position according to whether the sliding direction is changed in the above step S204 includes: after determining that the sliding direction is not changed, outputting a sliding position at a current moment as a touch position; after determining that the sliding direction is changed, clearing a record of a historical sliding position in an original sliding direction, outputting the sliding position at the current moment as the touch position, and recording the sliding position at the current moment as a first historical sliding position in a new sliding direction.

Figure 16:
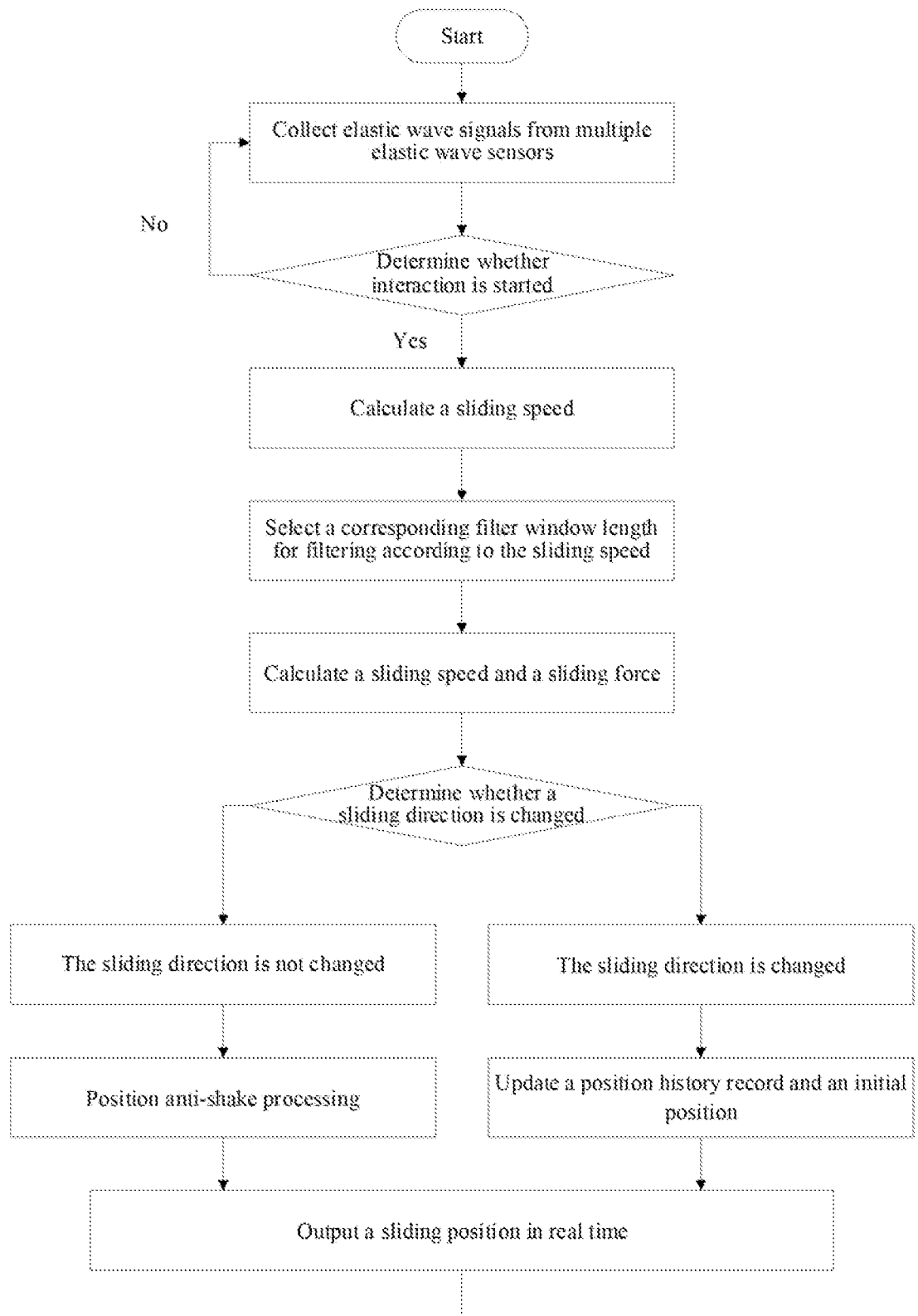
FIG. 16 is a flowchart of a sliding positioning method according to an application example of the present disclosure.
Figure 17A:
FIGS. 17A and 17B are a schematic diagram of a sliding trajectory obtained according to an existing method and a schematic diagram of a sliding trajectory obtained according to a method shown in an application example of the present disclosure respectively, when a user performs a same sliding operation on a touch sensing panel.
Figure 17B:
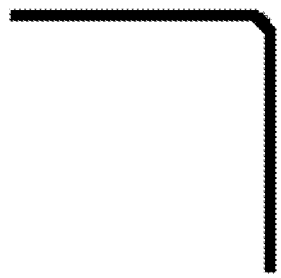

The method described in the above embodiment will be described below with an application example, as shown in FIG. 16. After collecting elastic wave signals from multiple elastic wave sensors, it is determined whether interaction is started according to the collected elastic wave signals, if it is determined that the interaction is not started, signal collection continues; if it is determined that the interaction is started, a preliminary positioned sliding position is obtained according to the collected elastic wave signals, a sliding speed at the current moment is obtained according to the preliminary positioned sliding position, and a corresponding filtering window length is selected according to the sliding speed at the current moment to filter an elastic wave signal output by each elastic wave sensor; an accurately positioned sliding position and a sliding force are obtained according to filtered elastic wave signal; whether a sliding direction is changed is determined according to the sliding position and the sliding force, if the sliding direction is not changed, the sliding position is subjected to anti-shake treatment and output; if the sliding direction is changed, a record of a historical sliding position in an original sliding direction is cleared, a sliding position at the current moment is output as the touch position, and the sliding position at the current moment is recorded as a first historical sliding position in a new sliding direction. FIG. 17A shows a sliding trajectory obtained according to an existing method when a user performs a sliding operation on a touch sensing panel, and FIG. 17B shows a sliding trajectory obtained according to the method shown in FIG. 16 when the user performs a same sliding operation on the touch sensing panel. It may be seen from the figures that positioning of the sliding trajectory obtained through the method of this embodiment is more accurate.

An embodiment of the present disclosure further provides a non-transient computer-readable storage medium storing one or more programs, and the one or more programs may be executed by one or more processors to implement the method as described in any of previous embodiments.

Figure 18:
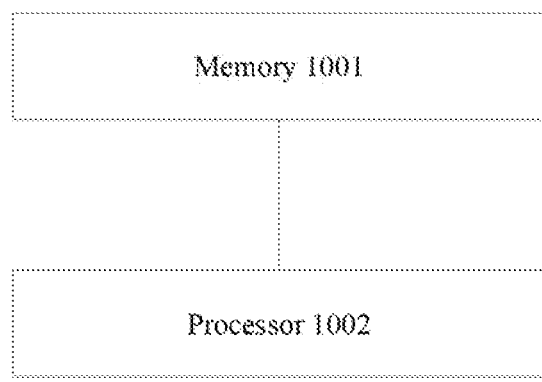
FIG. 18 is a structural diagram of a sliding positioning apparatus according to an embodiment of the present disclosure.

An embodiment of the present disclosure further provides a sliding positioning apparatus, as shown in FIG. 18, including a memory 1001 and a processor 1002. The memory 1001 stores a program, and when the program is read and executed by the processor 1002, the method as described in any of the previous embodiments is implemented.

A touch sensing apparatus involved in an embodiment of the present disclosure may include a touch panel, a force module and a touch module, the touch module may include multiple touch sensing electrodes, the touch module performs positioning according to electrical signals of the touch sensing electrodes to obtain touch coordinates, and the touch module may recognize whether touching is made by a palm or a finger, and send recognized information and the touch coordinates to the force module. The force module may include multiple elastic wave sensors, and an elastic wave sensor may receive an elastic wave signal and converts the elastic wave signal into a voltage signal; the force module calculates and obtains a force value according to a fluctuation change situation of a voltage signal. The force module may calculate force values at different positions of the touch panel. The force module may report a force value to a main controller of the touch sensing apparatus, and the main controller performs a touch sensing processing according to touch coordinates and the force value. The elastic wave sensor may be any one or more of a piezoelectric ceramic sensor, a resistance strain gauge, a fiber grating sensor, and a thin film piezoelectric sensor.

Figure 19:
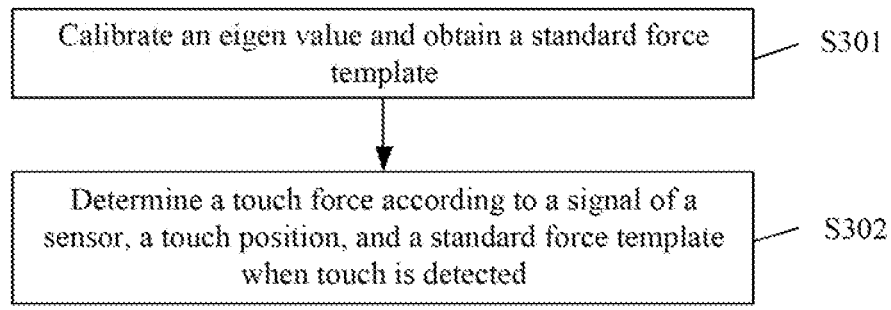
FIG. 19 is a flowchart of a touch sensing information determination method according to an embodiment of the present disclosure.

FIG. 19 is a flowchart of a touch sensing information determination method according to an embodiment of the present disclosure, and the method may be applied to a touch sensing apparatus including multiple sensors. As shown in FIG. 19, the touch sensing information determination method includes following steps.

S301: dotting multiple preset calibration positions under a preset calibration force, acquiring a dotting signal of an elastic wave sensor, generating an eigenvalue curve of the elastic wave sensor according to an eigenvalue of the dotting signal, calibrating eigenvalue curves of multiple elastic wave sensors to enable sensitivities of the multiple elastic wave sensors to be consistent with each other, and using a calibrated eigenvalue curve as a standard force template; wherein the dotting refers to touching a touch sensing panel with a preset calibration force.

S302: acquiring signals of the multiple elastic wave sensors when touching is detected, and determining a touch force according to the signals of the multiple elastic wave sensors, a touch position, and the standard force template.

In a conventional solution, most of calculation of a touch force is direct addition of weighted addition of amplitude values of multiple sensor signals, which has a disadvantage of insufficient resolution of the force. According to a solution provided by this embodiment, a sensor is calibrated by generating a standard force template in advance, so that a signal is more accurate and accuracy of force calculation may be improved. A touch force is calculated based on the standard force template, which may reduce calculation amount and improve calculation accuracy.

The touch sensing information determination method shown in FIG. 19 may be performed independently or may be combined with the touch sensing method shown in FIG. 1. When combined with the touch sensing method, whether touch sensing is valid touch sensing may be determined according to whether a touch force reaches a threshold before the touch sensing is performed according to the feature of the elastic wave signal, and the touch force may be obtained using the method shown in FIG. 19.

In an exemplary embodiment, multiple preset calibration positions are multiple positions on a touch panel and may be evenly distributed on the touch panel.

In an exemplary embodiment, the eigenvalue may be a peak.

In an exemplary embodiment, the dotting multiple preset calibration positions under the preset calibration force and acquiring the dotting signal of the elastic wave sensor in the step S301, includes: dotting multiple preset calibration positions under the preset calibration force for multiple times and acquiring multiple dotting signals of the elastic wave sensor al a same preset calibration position; the generating the eigenvalue curve of the elastic wave sensor according to the eigenvalue of the dot signal in the step S301 includes: acquiring an average value of eigenvalues of multiple dot signals at a same preset calibration position of a same elastic wave sensor, and generating an eigenvalue curve of the sensor according to the average value of the eigenvalues.

According to the solution provided by this embodiment, dotting is performed for multiple times at a same preset calibration position, so that errors may be reduced and accuracy may be improved.

In an exemplary embodiment, the calibrating the eigenvalue curves of the multiple elastic wave sensors to enable the sensitivities of the multiple elastic wave sensors to be consistent with each other in the step S301 includes: selecting an eigenvalue curve from the eigenvalue curves of the multiple elastic wave sensors as a reference eigenvalue curve, and selecting a reference point on the reference eigenvalue curve: determining a calibration coefficient of each elastic wave sensor according to a difference between a value of a corresponding point on an eigenvalue curve other than the reference eigenvalue curve and the reference point, wherein the calibration coefficient makes the value of the corresponding point equal to a value of the reference point after being calibrated by the calibration coefficient; and calibrating the eigenvalue curve other than the reference eigenvalue curve through the calibration coefficient. An eigenvalue curve of each elastic wave sensor is calibrated using a corresponding calibration coefficient of the elastic wave sensor.

The corresponding point refers to a point selected on the eigenvalue curve other than the reference eigenvalue curve according to a same selection principle for selecting the reference point. For example, the reference point may be a point where a peak is located, that is, a point where a peak of the reference eigenvalue curve is located is taken as the reference point. For any eigenvalue curve other than the reference eigenvalue curve, a corresponding point is a point where a peak of the eigenvalue curve is located.

In an exemplary embodiment, any eigenvalue curve may be selected as the reference eigenvalue curve.

In an exemplary embodiment, the calibration coefficient makes the value of the corresponding point equal to a value of the reference point after being calibrated by the calibration coefficient, that is, a product of the value of the corresponding point and the calibration coefficient is equal to the value of the reference point.

In an exemplary embodiment, the determining the touch force according to the signals of the multiple elastic wave sensors, the touch position, and the standard force template in the step S302 includes: determining a force vector Y according to the touch position and the standard force template, wherein the force vector Y includes values of the multiple elastic wave sensors corresponding to the touch position in the standard force template, determining a value of k according to $k=(Y^TY)-Y^Tx$, and determining the touch force to be k*the preset calibration force, and the x is a vector formed by the signals of the multiple elastic wave sensors after being calibrated by corresponding calibration coefficients.

In an exemplary embodiment, the method further includes: for each preset calibration position, performing a normalization processing on values of the calibrated eigenvalue curves of the multiple elastic wave sensors, and generating a standard position template, wherein the normalization processing includes: normalizing values of calibrated eigenvalue curves of multiple elastic wave sensors corresponding to a same preset calibration position with a maximum value of the values of the calibrated eigenvalue curves of the multiple elastic wave sensors corresponding to the preset calibration position; and determining a touch position according to the signals of the multiple elastic wave sensors after being calibrated by corresponding calibration coefficients and the standard position template.

In a general solution, acquisition of a touch position is based on multi-sensor data and calculation using a centroid method, which has disadvantages of poor accuracy and poor anti-interference ability. In a solution provided by this embodiment, a touch position is determined through a standard position template, which has less calculation amount, high calculation accuracy, and strong anti-interference ability.

In an exemplary embodiment, the determining the touch position according to the signals of the multiple elastic wave sensors and the standard position template includes: performing a normalization processing on a vector x formed by the signals of the multiple elastic wave sensors after being calibrating by corresponding calibration coefficients to obtain x'; and calculating a distance between x' and a vector formed by values of normalized eigenvalue curves of multiple elastic wave sensors corresponding to a preset calibration position in the standard position template, and taking a preset calibration position corresponding to a vector with a smallest distance as the touch position. That is to say, in the standard position template, values of multiple elastic wave sensors in an eigenvalue curve correspond to a preset calibration position, and values of an eigenvalue curve of different elastic wave sensors corresponding to a same preset calibration position are different. x' is data of multiple elastic wave sensors corresponding to a current touch position. A value of an eigenvalue curve of an elastic wave sensor closest to x' is searched, and then a preset calibration position corresponding to the value of the eigenvalue curve of the elastic wave sensor is found and taken as the touch position.

In an exemplary embodiment, the method further includes: determining a down-sampling level; the acquiring the signals of the multiple elastic wave sensors includes: acquiring data of the multiple elastic wave sensors at a preset sampling frequency, down-sampling the acquired data at the down-sampling level, and taking the down-sampled data as the signals of the multiple elastic wave sensors.

In an exemplary embodiment, the determining the down-sampling level includes: collecting data of multiple elastic wave sensors at a preset sampling frequency, and calculating a touch position and a touch force based on the collected data; down-sampling the collected data at multiple down-sampling levels respectively, calculating a touch position and a touch force respectively according to down-sampled data with different down-sampled levels to obtain a touch position and a touch force corresponding to each down-sampling level, determining a position linearity parameter according to touch positions corresponding to different down-sampling levels, determining a force continuity parameter according to touch forces corresponding to the different down-sampling levels, and determining a down-sampling level according to the position linearity parameter and the force continuity parameter; wherein the position linearity parameter is determined according to changes of an average touch position at adjacent moments in multiple moments and a quantity of, distances of touch positions at the adjacent moments equal to a minimum resolution position unit, and the force continuity parameter is a parameter indicating continuity of touch force changes at multiple moments.

In an exemplary embodiment, the positional linearity parameter may be determined according to a following formula.

$$L = \frac{\sum_{k=2}^{N} |S_k - S_{k-1}|}{N-1} * \sum_{k=2}^{N} T_k$$

$$T_k = \begin{cases} 1 & \text{if } |S_k - S_{k-1}| = \Delta S \\ 0 & \text{other} \end{cases}$$

Among them, L is the position linearity parameter. N is a natural number and N is greater than or equal to 2, $S_k$ represents a touch position at moment k, $\Delta S$ represents a minimum resolution position unit, and $T_k$ represents a quantity of distances between adjacent frames by statistics and the distances are equal to $\Delta S$.

In an exemplary embodiment, the force continuity parameter may be determined according to a following formula.

$$C = \sum_{k=2}^{N} \frac{\sqrt{|F_k - F_{k-1}| * |F_{k-1} - F_{k-2}|}}{|F_k - F_{k-1}| + |F_{k-1} - F_{k-2}|}$$

Among them, C is the force continuity parameter, $F_k$ represents a touch force at moment k, N is a natural number, and N is greater than or equal to 3.

In an exemplary embodiment, the determining the down-sampling level based on the position linearity parameter and the force continuity parameter may include: selecting a down-sampling level corresponding to a touch force and a touch position that maximizes a product of the position linearity parameter and the force continuity parameter; or, selecting a down-sampling level corresponding to a touch force and a touch position that maximizes $y_i$:

$$y_i = w_L * \frac{L_i}{\max(L_1, L_2, \ldots, L_M)} + w_C * C_i,$$

among them, $w_L$ is a preset weight of a position linearity parameter, $w_C$ is a preset weight of a force continuity parameter, a value of $w_L$ is 0 to 1, a value of $w_C$ is 0 to 2, and $$w_L + \frac{w_C}{2} = 1, L_i$$

is a position linearity parameter determined according to a touch position corresponding to an i-th down-sampling level, $C_i$ is a force continuity parameter determined according to a touch force corresponding to the i-th down-sampling level, a value of i is 1 to W, and W is a quantity of down-sampling levels.

A technical solution of the above embodiment is further explained below through an application example.

Figure 20:
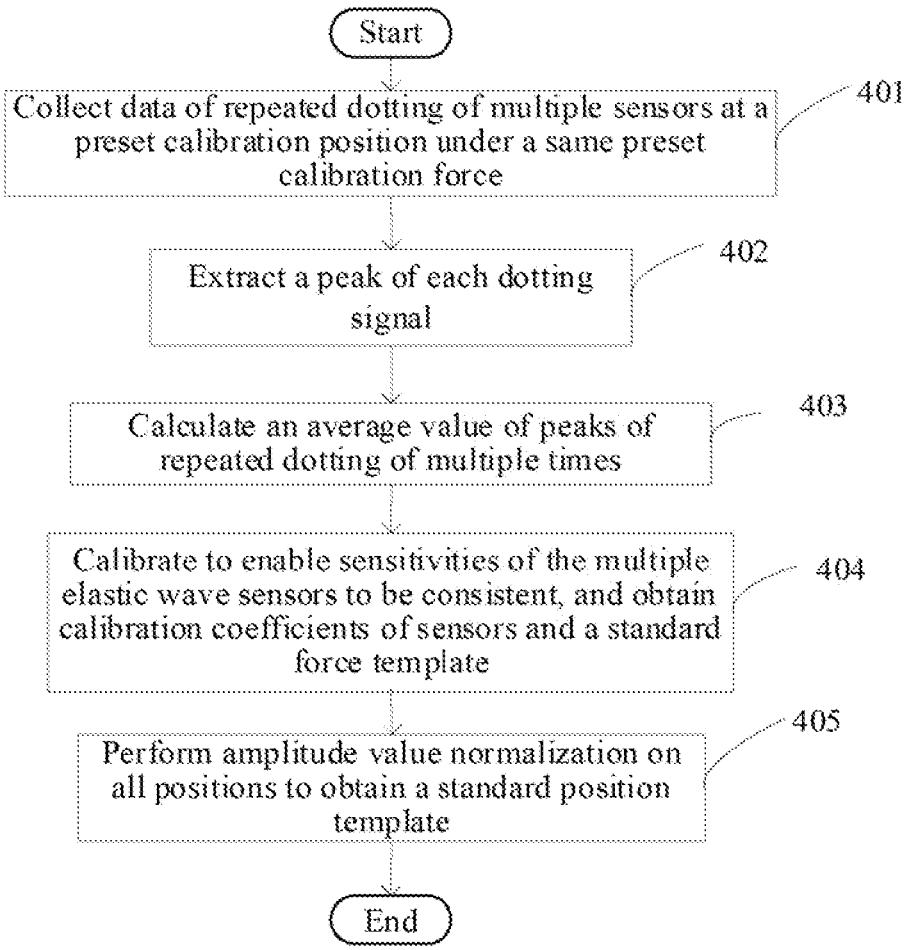
FIG. 20 is a flowchart of a standard position template and standard force template determination method according to an embodiment of the present disclosure.

FIG. 20 is a flowchart of a standard position template and standard force template determination method according to an exemplary embodiment. In this embodiment, a touch sensing apparatus includes three elastic wave sensors. As shown in FIG. 20, the standard position template and standard force template determination method according to this embodiment includes following steps.

Step 401: performing dotting for multiple times on multiple preset calibration apparatuses under a same preset calibration force.

In this embodiment, 21 preset calibration positions are included, each preset calibration position may be repeatedly dotted for three times, and accidental errors caused by a dotting device and other factors may be avoided.

Figure 21:
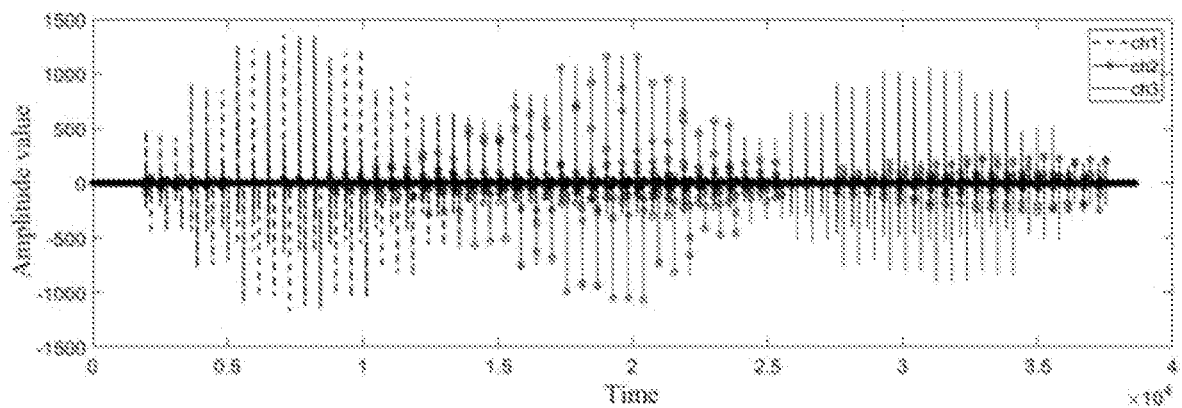
FIG. 21 is a schematic diagram of a dot signal according to an exemplary embodiment.

Collected dotting signals of three elastic wave sensors are shown in FIG. 21. The three elastic wave sensors are respectively a first sensor ch1, a second sensor ch2, and a third sensor ch3. Dotting signals of the first sensor ch1 are represented by dashed lines, dotting signals of the second sensor ch2 are represented by solid lines, and dotting signals of the third sensor ch3 are represented by dotted lines.

Step 402: determining an eigenvalue of each dotting signal.

Figure 22:
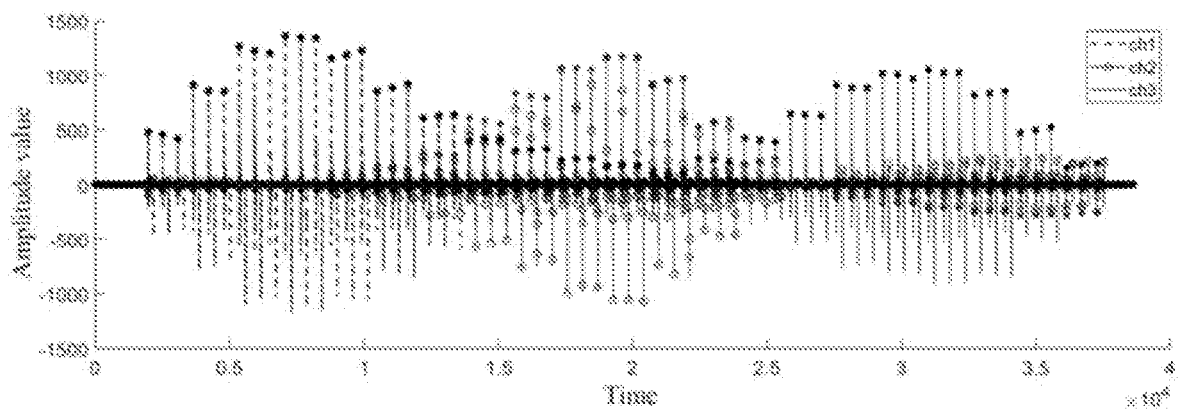
FIG. 22 is a schematic diagram of a peak value of a dot signal according to an exemplary embodiment.

In this embodiment, an eigenvalue is a peak. As shown in FIG. 22.

Figure 23:
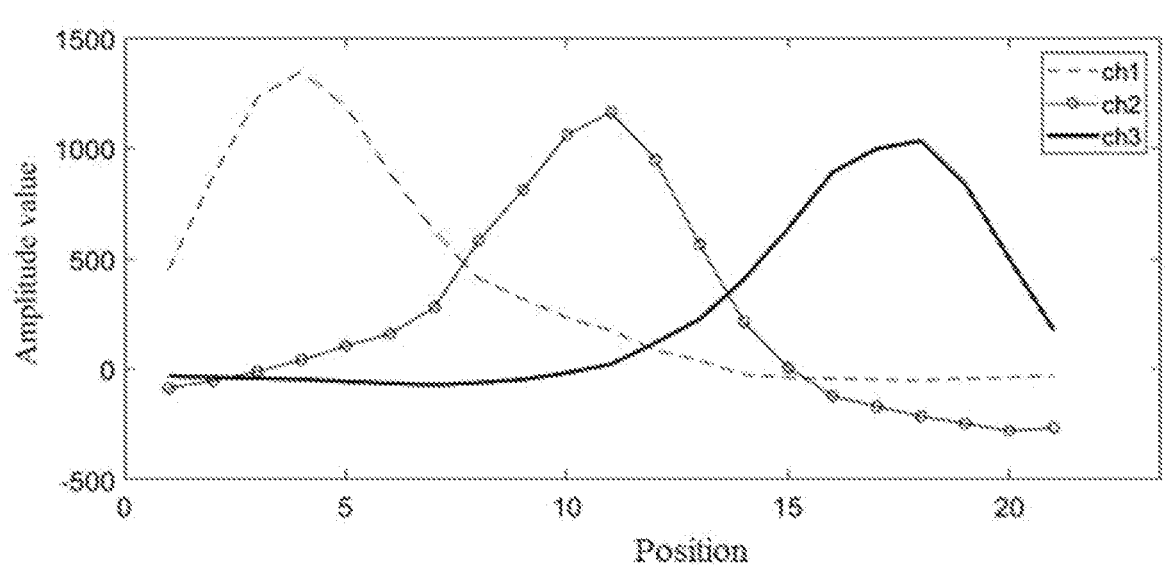
FIG. 23 is a schematic diagram of an eigenvalue curve of a dot signal according to an exemplary embodiment.

Step 403: calculating an average value of eigenvalues of three dotting signals of each elastic wave sensor at each preset calibration position (in this embodiment, an average value of peaks is calculated) to generate an eigenvalue curve, as shown in FIG. 23. Among them, an eigenvalue curve of the first sensor ch1 is represented by a dashed line, an eigenvalue curve of the second sensor ch2 is represented by a solid line, and an eigenvalue curve of the third sensor ch3 is represented by a dotted line.

In an exemplary embodiment, if there are multiple dotting signals, peaks of some of the dotting signals may be selected and averaged to generate an eigenvalue curve, for example, peaks are averaged after an obvious error value in the peaks is removed.

Step 404: determining a calibration coefficient of each elastic wave sensor, sensitivities of the multiple elastic wave sensors are calibrated to be consistent with each other, eigenvalue curves of the three sensors after calibration are obtained, and a waveform is saved as a standard force template.

Figure 24:
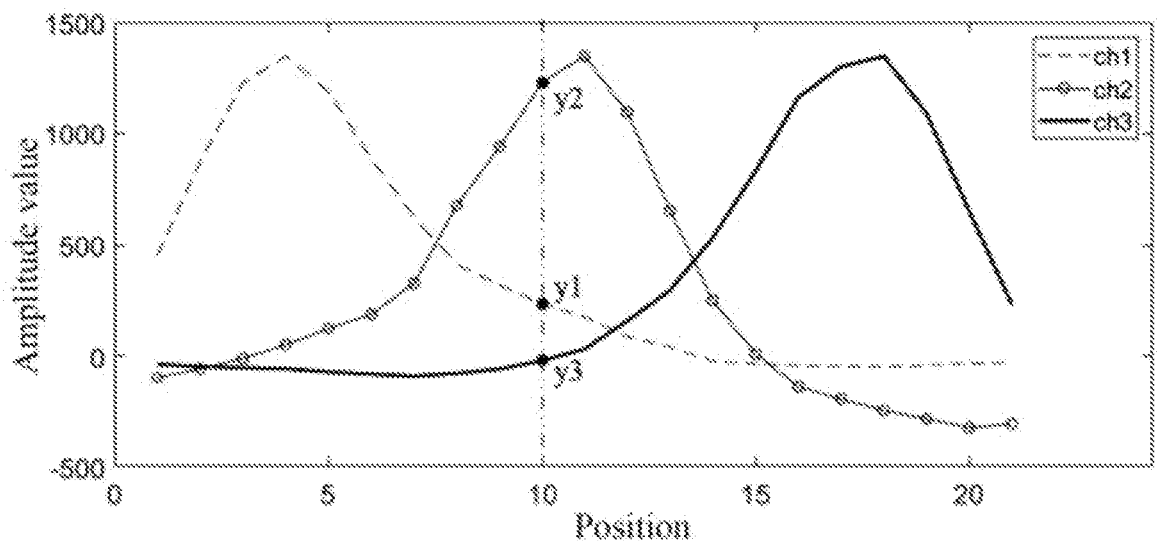
FIG. 24 is a schematic diagram of a standard force template according to an exemplary embodiment.

As shown in FIG. 24, taking an eigenvalue curve of the first sensor ch1 as a reference eigenvalue curve, taking a peak of the reference eigenvalue curve as a reference point, an eigenvalue value curve of the second sensor ch2 is calibrated using a second calibration parameter (i.e., a calibration coefficient of the second sensor ch2), so that a peak of the second sensor ch2 is the same as the peak of the reference eigenvalue curve (values of remaining points of the second sensor ch2 are also calibrated using the second calibration parameter), an eigenvalue curve of the third sensor ch3 is calibrated using a third calibration parameter (i.e., a calibration coefficient of the third sensor ch3) so that a peak of the third sensor ch3 is the same as the peak of the reference eigenvalue curve (values of remaining points of the third sensor ch3 are also calibrated using the third calibration parameter), and a waveform shown in FIG. 24 is obtained and stored as a standard force template.

Step 405: normalizing an amplitude value of each position in the standard force template to obtain a standard position template.

Figure 25:
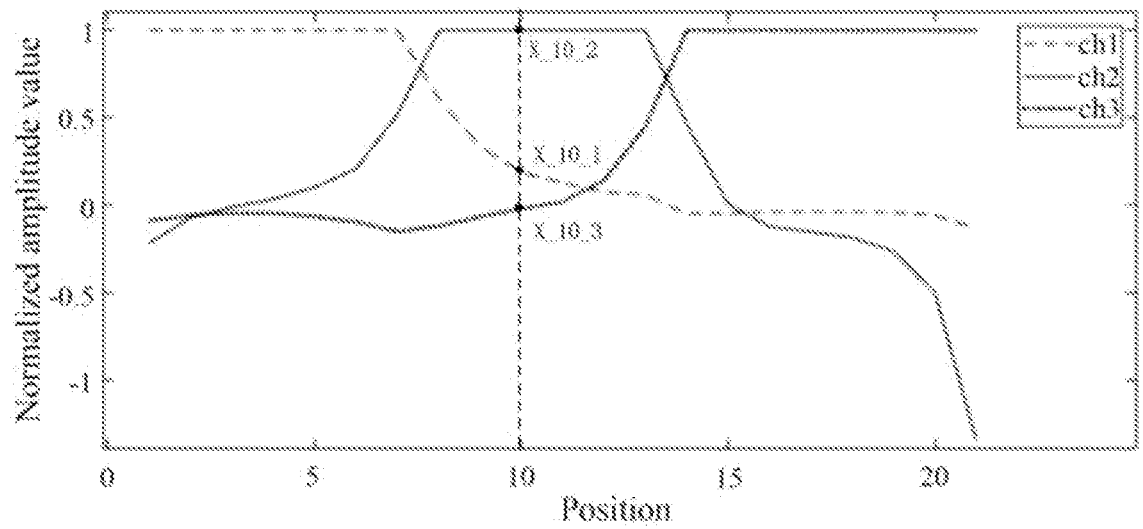
FIG. 25 is a schematic diagram of a standard position template according to an exemplary embodiment.

As shown in FIG. 25, for any position, a maximum value in values of three eigenvalue curves of the position is normalized to 1, and remaining values are divided by the maximum value to obtain new values, thereby obtaining a normalized eigenvalue curve shown in FIG. 25 as the standard position template.

Figure 26:
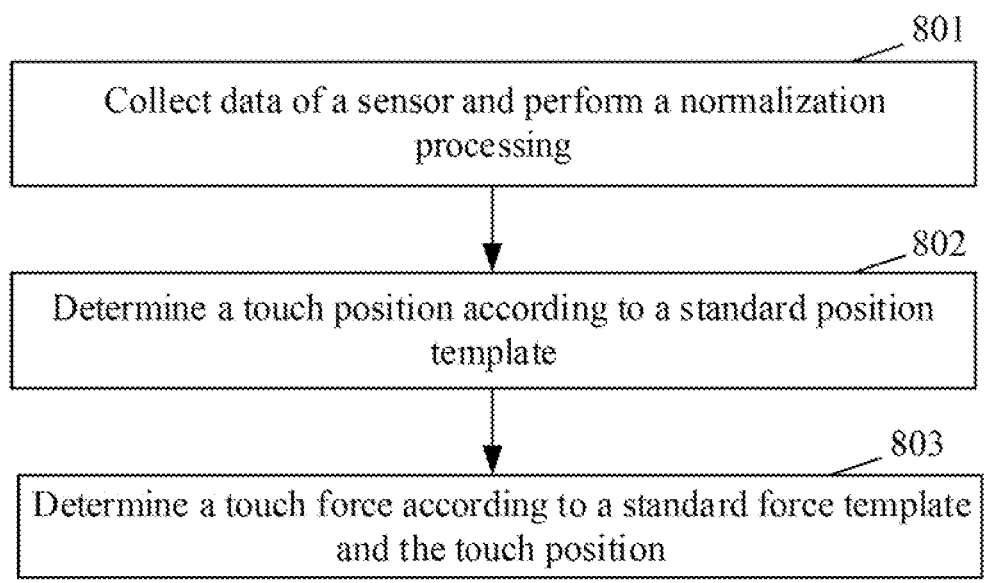
FIG. 26 is a flowchart of a touch information determination method according to an exemplary embodiment.

FIG. 26 is a flowchart of a touch sensing information determination method according to an exemplary embodiment. In this embodiment, a touch sensing apparatus includes three sensors. As shown in FIG. 26, the touch sensing information determination method according to this embodiment includes following steps.

Step 801: collecting data x=[x1, x2, x3] of three elastic wave sensors in real time, to obtain normalized data x', wherein a normalization method is:

$$x' = \frac{x}{\max(x)},$$

i.e., $$x' = \left[\frac{x1}{\max(x1, x2, x3)}, \frac{x2}{\max(x1, x2, x3)}, \frac{x3}{\max(x1, x2, x3)}\right].$$

x1, x2, x3 are data calibrated by calibration coefficients of corresponding elastic wave sensors.

Step 802: a distance from x' to each preset calibration position in a standard position template is calculated, and a preset calibration position with a smallest distance is selected as a current touch position; that is, Position=min (distinct(x', P1), . . . , distance(x', Pn), wherein Pi represents values of the three sensors corresponding to an i-th preset calibration position in the standard position template shown in FIG. 25. For example, P10=(X_10_1, X_10_2, X_10_3). distance (x', P1) is, for example, a Euclidean distance.

Step 803: a force vector Y corresponding to the current touch position is selected from a standard force template and a touch force value may be calculated by minimizing a residual error using a least square method: $\min_k \|x-kY\|^2$.

By using a normal equation, $k=(Y^T Y)^{-1} Y^T x$ is obtained.

For example, as shown in FIG. 24, if a touch position is a 10-th preset calibration position, the force vector $Y=(y1, y2, y3)$.

When a preset calibration force of a standard force template is 300 g (gram), when k is obtained from certain touch, it means that a touch force value at this time is k*300 g.

Figure 27:
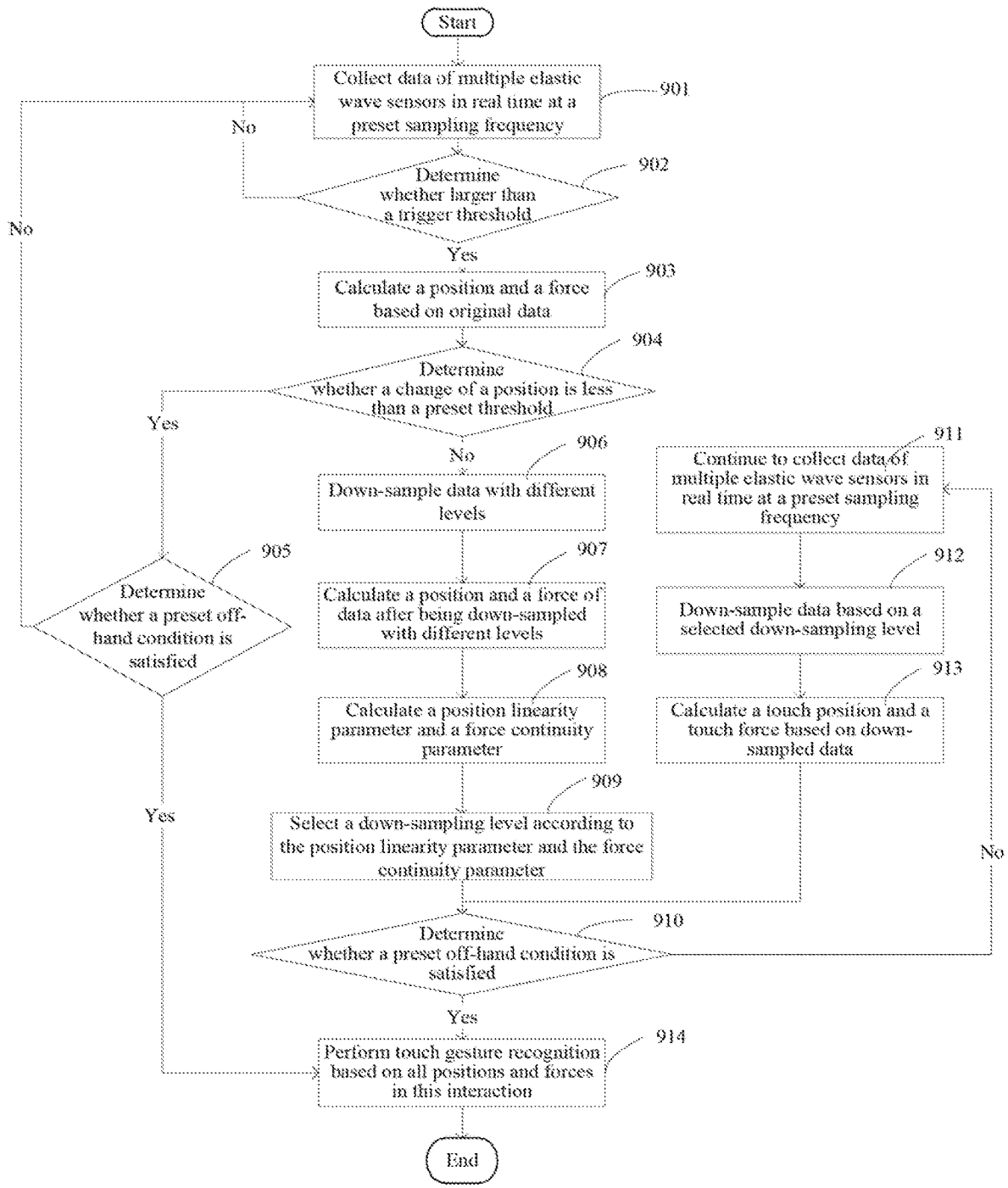
FIG. 27 is a flowchart of a down-sampling level determination method according to an exemplary embodiment.

FIG. 27 is a flowchart of a method for determining a down-sampling level according to an exemplary embodiment. As shown in FIG. 27, the method for determining the down-sampling level according to the present embodiment includes following steps.

Step 901: collecting data of multiple elastic wave sensors in real time at a preset sampling frequency.

Step 902: determining whether the collected data is larger than a preset trigger threshold, if it is determined that the collected data is larger than the preset trigger threshold, performing the step 903, otherwise, returning to the step 901.

Step 903: calculating a touch position and a touch force based on the collected data.

In this embodiment, data that has not been down-sampled is called original data.

Step 904: determining whether a change of the touch position is less than a preset threshold; if it is determined that the change of the touch position is less than the preset threshold, performing step 905; otherwise, performing step 906.

Step 905L determining whether a preset off-hand condition is satisfied, if it is determined that the preset off-hand condition is satisfied, performing step 914; otherwise, performing step 901.

The preset off-hand condition may be, for example, that the touch force is less than an off-hand threshold, and the like.

Step 906: down-sampling original data at a down-sampling level.

Multiple down-sampling levels may be preset, and down-sampling may be performed with the preset multiple down-sampling levels respectively.

Step 907: calculating a touch position and a touch force according to data obtained after down-sampling with different down-sampling levels; a calculation method is referred to the foregoing embodiments and will not be repeated here.

Step 908: calculating a position linearity parameter and a force continuity parameter according to the touch position and the touch force.

The position linearity parameter consists of two parts, namely, a position discrimination degree and a position subdivision degree, wherein the position discrimination degree is obtained by calculating an average position change at adjacent moments, and the larger the value is, the greater the position discrimination degree at different moments will be caused by down-sampling levels at this time, which is beneficial to real-time calculation and linear output of a touch position; the position subdivision degree is obtained by calculating a statistical quantity of distances between adjacent moments and the distances are equal to a minimum resolution position unit, the greater the value is, the better the position subdivision degree at different moments will be caused by down-sampling levels at this time, which is conducive to calculation of all touch positions without omission. The position discrimination degree may be represented using $$\frac{\sum_{k=2}^{N} |S_k - S_{k-1}|}{N-1},$$

the position subdivision degree may be represented using $$\sum_{k=2}^{N} T_k,$$

the two are integrated, and the position linearity parameter may be determined according to a following formula.

$$L = \frac{\sum_{k=2}^{N} |S_k - S_{k-1}|}{N-1} * \sum_{k=2}^{N} T_k,$$

$$T_k = \begin{cases} 1 & \text{if } |S_k - S_{k-1}| = \Delta S \\ 0 & \text{other} \end{cases}$$

Among them, L is the position linearity parameter. N is a natural number and N is greater than or equal to 2, $S_k$ represents a touch position at moment k, that is, a touch position calculated according to data at moment $$k, T = \sum_{k=2}^{N} T_k$$

represents that a statistical quantity of distances between adjacent moments and the distances are equal to $\Delta S$, $\Delta S$ represents a minimum resolution position unit.

The force continuity parameter may be determined according to a following formula.

$$C = \sum_{k=3}^{N} \frac{\sqrt{|F_k - F_{k-1}| * |F_{k-1} - F_{k-2}|}}{|F_k - F_{k-1}| + |F_{k-1} - F_{k-2}|}$$

Among them, C is the force continuity parameter, $F_k$ represents a touch force at moment k, N is a natural number, and N is greater than or equal to 3. The force continuity parameter is used for describing continuity of force changes at first N moments, and the larger the value of C is, the more continuous the force is.

Step 909: determining a down-sampling level according to the position linearity parameter and the force continuity parameter.

For example, a down-sampling level that maximizes a product of the position linearity parameter and the force continuity parameter is selected; or, weights $w_L$ and $w_C$ are respectively set for the position linearity parameter and the force continuity parameter, a combination index $$y_i = w_L * \frac{L_i}{\max(L_1, L_2, \ldots, L_N)} + w_C * C_i$$

is constructed, and then a down-sampling level that maximizes the combination index is selected; wherein a value of $w_L$ ranges from 0 to 1, a value of $w_C$ range from 0 to 2, and $$w_L + \frac{w_C}{2} = 1$$

a value of i is 1 to W, and W is a quantity of down-sampling levels.

Step 910: determining whether a preset off-hand condition is currently satisfied, and if it is determined that the preset off-hand condition is currently satisfied, performing step 914; if it is determined that the preset off-band condition is not currently satisfied, performing step 911.

Step 911: collecting data of multiple elastic wave sensors in real time at a preset sampling frequency.

Step 912: down-sampling the collected data based on the selected down-sampling level.

Step 913: calculating a touch position and a touch force based on the down-sampled data.

Step 914: performing touch sensing based on all touch positions and touch forces in this interaction, and ending.

For example, paths and force change waveforms formed by all positions in this interaction are matched with preset gestures to implement touch sensing.

Figure 28:
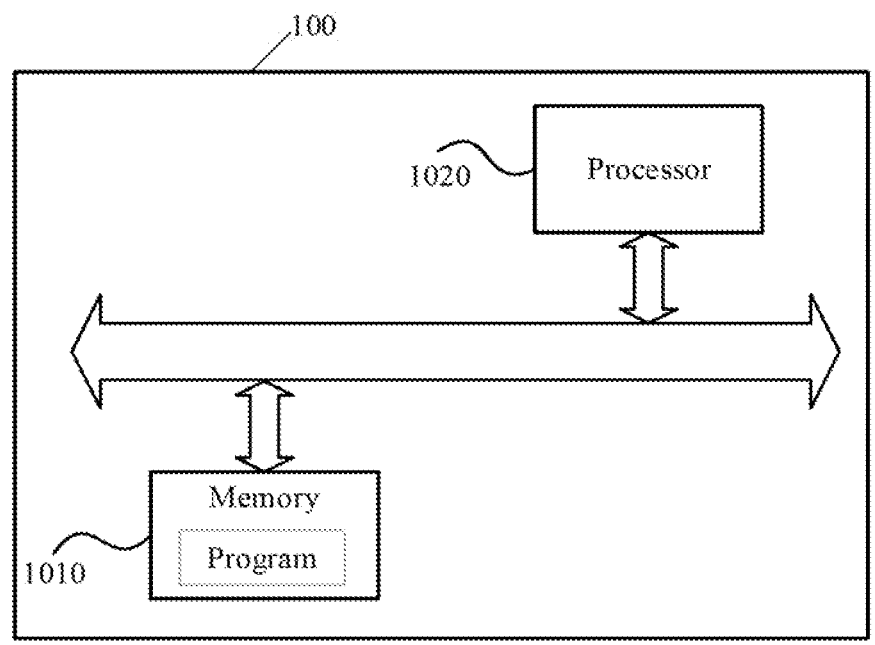
FIG. 28 is a schematic diagram of a touch sensing information determination apparatus according to an exemplary embodiment.

As shown in FIG. 28, an embodiment of the present disclosure provides a touch sensing information determination apparatus 100, which includes a memory 1010 and a processor 1020, wherein the memory 1010 stores a program, and when the program is read and executed by the processor 1020, the touch sensing information determination method described in any of the above embodiments is implemented.

Figure 29:
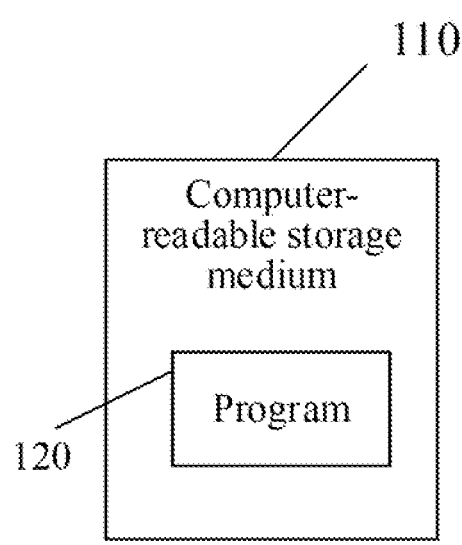
FIG. 29 is a schematic diagram of a computer readable storage medium according to an exemplary embodiment.

As shown in FIG. 29, an embodiment of the present disclosure provides a non-transient computer-readable storage medium 110 that stores one or more programs 120, and the one or more programs 120 may be executed by one or more processors to implement the touch sensing information determination method of any of the above embodiments.

An embodiment of the present disclosure provides a touch sensing apparatus, which includes the touch sensing information determination apparatus.

Multiple methods for determining a touch position (sliding position) given herein may be interchangeable with each other. Multiple methods for determining a touch force (sliding force) given herein may be interchangeable with each other.

It may be understood by those skilled in the art that all or some of the steps in the methods, functional modules/units in the systems and apparatuses disclosed above may be implemented as software, firmware, hardware, and their appropriate combinations. In a hardware implementation mode, a division between functional modules/units mentioned in the above description does not necessarily correspond to a division of physical components; for example, a physical component may have multiple functions, or a function or step may be cooperatively performed by several physical components. Some or all of the components may be implemented as software executed by a processor, such as a Digital Signal Processor or a microprocessor, or implemented as hardware, or implemented as an integrated circuit, such as an Application Specific Integrated Circuit. Such software may be distributed on a computer-readable medium, which may include a computer storage medium (or a non-transitory medium) and a communication medium (or a transitory medium). As well known to those of ordinary skill in the art, the term computer storage medium includes a volatile, nonvolatile, removable, and non-removable medium implemented in any method or technology for storing information (such as computer readable instructions, a data structure, a program module, or other data). A computer storage medium includes, but is not limited to, a Random Access Memory (RAM), a Read Only Memory (ROM), an Electrically Erasable Programmable Read-Only Memory (EEPROM), a flash memory, or another memory technology, a Compact Disk-Read Only Memory (CD-ROM), a Digital Versatile Disk (DVD), or another optical disk storage, a magnetic box, a magnetic tape, a magnetic disk storage, or another magnetic storage apparatus, or any other medium that may be configured to store desired information and may be accessed by a computer. In addition, it is well known to those of ordinary skill in the art that a communication medium generally contains computer readable instructions, a data structure, a program module, or other data in a modulated data signal such as a carrier wave or another transmission mechanism, and may include any information delivery medium.

Although implementation modes disclosed in the present disclosure are as described above, the described contents are only implementation modes used for facilitating understanding of in the present disclosure, and are not intended to limit in the present disclosure. Any person skilled in the art of the present disclosure may make any modification and change in forms and details of implementation without departing from the spirit and scope disclosed in the present disclosure. However, the scope of patent protection of the present disclosure is still subject to the scope defined in the appended claims.

The invention claimed is:

1. A touch sensing method, applied to a touch sensing apparatus comprising a plurality of elastic wave sensors, comprising:
   acquiring elastic wave signals detected by the plurality of elastic wave sensors mounted on the touch sensing apparatus;
   determining a feature of the elastic wave signals, wherein the feature comprises: a synchronous feature, or an asynchronous feature; and
   performing touch sensing according to the feature of the elastic wave signals;
   wherein the performing the touch sensing according to the feature of the elastic wave signals comprises:
   recognizing current touch sensing as taping when the elastic wave signals corresponding to the plurality of elastic wave sensors have the synchronous feature; and
   recognizing current touch sensing as sliding when the elastic wave signals corresponding to the plurality of elastic wave sensors have the asynchronous feature;
   wherein the synchronous feature means that a phase difference between the elastic wave signals is less than or equal to a preset time difference, and a phase difference between peaks or troughs of the elastic wave signals is less than or equal to the preset time difference; the asynchronous feature means that the phase difference between the peaks or troughs of the elastic wave signals is larger than the preset time difference and the elastic wave signals will not intersect at a same time point in a process of touch sensing.

2. The touch sensing method according to claim 1, wherein after recognizing the current touch sensing as the sliding, the method further comprises:
   determining a direction of the sliding according to positions where the plurality of elastic wave sensors corresponding to the elastic wave signals with peaks or troughs appearing successively are located;
   determining that the direction of the sliding is from a first position to a second position when a position where an elastic wave sensor corresponding to an elastic wave signal with an earliest peak or trough is located is the first position and a position where an elastic wave sensor corresponding to an elastic wave signal with a latest peak or trough is located is the second position.

3. The touch sensing method according to claim 2, after determining the direction of the sliding, the method further comprises:

obtaining a sliding position and a sliding force according to a collected elastic wave signal; and determining whether the direction of the sliding is changed according to the sliding position and the sliding force.

4. The touch sensing method according to claim 3, wherein the obtaining the sliding position and the sliding force according to the collected elastic wave signal comprises:

obtaining a preliminary positioned sliding position according to the collected elastic wave signal, and obtaining a sliding speed according to the preliminary positioned sliding position;

selecting a filtering mode according the sliding speed to filter an elastic wave signal output by each elastic wave sensor of the plurality of elastic wave sensors after collecting elastic wave signals from the plurality of elastic wave sensors respectively; and obtaining an accurately positioned sliding position and the sliding force according to a filtered elastic wave signal;

wherein the obtaining the sliding speed according to the preliminary positioned sliding position comprises: determining an average sliding speed according to a preliminary positioned sliding position at a current moment and an accurately positioned sliding position at a previous moment; obtaining a sliding speed at the current moment according to the average sliding speed and a sliding speed obtained at the previous moment.

5. The touch sensing method according to claim 4, wherein the selecting the filtering mode according to the sliding speed to filter the elastic wave signal output by each elastic wave sensor of the plurality of elastic wave sensors comprises:

when a collection frequency is less than a preset frequency threshold, selecting a filter window length according to a preset speed interval where the sliding speed at the current moment is located and an obtained corresponding relationship between a preset sliding speed interval and the filter window length, wherein the larger the sliding speed is, the shorter the corresponding filter window length is;

when the collection frequency is equal to or greater than the preset frequency threshold, selecting filters with different frequencies according to the sliding speed at the current moment to filter the elastic wave signal output by each elastic wave sensor of the plurality of elastic wave sensors;

wherein the corresponding relationship between the preset sliding speed interval and the filter window length is obtained using a following method: in a case of selecting a speed $V_x$ randomly in each preset sliding speed interval for sliding, filtering collected M elastic wave signals output by any elastic wave sensor using filter window lengths with different preset lengths respectively, and calculating a smoothing index K according to the filtered M elastic wave signals:

$$K = \frac{\sum_{n=1}^{M}[f(n)-f(n-1)]^2}{n-1} * \frac{1}{V_x},$$

wherein $n \in M$, and M is a positive integer greater than or equal to 2, f(n) is an n-th collected elastic wave signal value after filtering, f(n−1) is an (n−1)-th collected elastic wave signal value after filtering; selecting a smoothing index K which is smaller than a preset smoothness threshold and has a smallest value from a plurality of smoothing indexes K obtained according to the filter window lengths with the different preset lengths, and taking a filter window length corresponding to the selected smoothing index K as a filter window length corresponding to a sliding speed interval where $V_x$ is located.

6. The touch sensing method according to claim 3, wherein the determining whether the direction of the sliding direction is changed according to the sliding position and the sliding force comprises:

determining a historical direction of the sliding according to a historical sliding position, and determining a position change direction according to a sliding position at a current moment and a sliding position at a previous moment, and determining that the direction of the sliding is not changed when the position change direction is consistent with the historical direction of the sliding; determining that the direction of the sliding is changed when the position change direction is inconsistent with the historical direction of the sliding; and after determining whether the direction of the sliding is changed according to the sliding position and the sliding force, the method further comprises: outputting a touch position according to whether the direction of the sliding is changed, which comprises: outputting the sliding position at the current moment as the touch position after determining that the direction of the sliding is not changed; after determining that the direction of the sliding direction is changed, clearing a record of a historical sliding position in an original direction of the sliding, outputting the sliding position at the current moment as the touch position, and recording the sliding position at the current moment as a first historical sliding position in a new direction of the sliding.

7. The touch sensing method according to claim 6, wherein before determining the historical direction of the sliding according to the historical sliding position, the method further comprises:

determining whether the current touch sensing is a continuous sliding operation according to the sliding force; when the current touch sensing is the continuous sliding operation, determining whether a quantity of historical sliding positions formed by or a distance passed by the continuous sliding operation exceeds a corresponding commutation threshold; when the quantity of the historical sliding positions formed by or the distance passed by the sliding operation exceeds the corresponding commutation threshold, performing the determining the historical direction of the sliding according to the historical sliding position; when the quantity of the historical sliding positions formed by or the distance passed by the continuous sliding operation does not exceed the corresponding commutation threshold, determining that the direction of the sliding is not changed; when the current touch sensing is not the continuous sliding operation, performing the determining the historical direction of the sliding according to the historical sliding position.

8. The touch sensing method according to claim 7, wherein the determining whether the current touch sensing is the continuous sliding operation according to the sliding force comprises:

determining whether a sliding force at the current moment is less than a stored local peak force, and when the sliding force at the current moment is less than the stored local peak force, determining whether an absolute value of a difference value between the sliding force at the current moment and a sliding force at the previous moment is less than or equal to a force change threshold; and determining whether a relationship between the sliding force and sliding time conforms to a preset force release function;

when the absolute value of the difference value between the sliding force at the current moment and the sliding force at the previous moment is greater than the force change threshold, or the relationship between the sliding force and the sliding time does not conform to the preset force release function, determining that the current touch sensing is the continuous sliding operation;

when the absolute value of the difference value between the sliding force at the current moment and the sliding force at the previous moment is less than or equal to the force change threshold, and the relationship between the sliding force and the sliding time conforms to the preset force release function, determining that the current touch sensing is not the continuous sliding operation;

when the sliding force at the current moment is greater than or equal to the stored local peak force, determining the current touch sensing is the continuous sliding operation and updating the stored local peak force using the sliding force at the current moment;

wherein the force change threshold is a local peak force with a predetermined proportion; the preset force release function is $y=A*e^{-Kt}$, wherein A, K are fixed constants determined according to a hardware parameter of an elastic wave sensor, t is time, and y is a sliding force.

9. The touch sensing method according to claim 1, wherein the method further comprises: determining a valid elastic wave signal after acquiring the elastic wave signals;

the determining the valid elastic wave signal comprises:
determining a signal start point and a signal end point of touching the touch sensing apparatus by a hand in an elastic wave signal according to an amplitude of the elastic wave signal, which comprises:

determining the signal start point and the signal end point according to the amplitude of the elastic wave signal, taking a minimum time point corresponding to an amplitude whose absolute value of the elastic wave signal is greater than a first threshold as the signal start point, and taking a minimum time point corresponding to an amplitude whose absolute value of the elastic wave signal is smaller than a second threshold as the signal end point; or determining the signal start point and the signal end point according to amplitudes of a plurality of elastic wave signals, acquiring a cumulative value of absolute values of the amplitudes of the plurality of elastic wave signals at the same time point, taking a minimum time point corresponding to a cumulative value larger than a third threshold as the signal start point, and taking a minimum time point corresponding to a cumulative value smaller than a fourth threshold as the signal end point; or determining the signal start point and the signal end point according to the amplitudes of the plurality of elastic wave signals, acquiring a cumulative average value of the absolute values of the amplitudes of the plurality of elastic wave signals at the same time point, taking a minimum time point corresponding to a cumulative average value larger than a fifth threshold as the signal start point, and taking a minimum time point corresponding to a cumulative average value smaller than a sixth threshold as the signal end point.

10. The touch sensing method according to claim 9, after the determining the signal start point and the signal end point of touching the touch sensing apparatus by the hand in the elastic wave signal according to the amplitude of the elastic wave signal, the method further comprises:

correcting the signal start point and the signal end point: determining a position of a maximum amplitude between the signal start point and the signal end point, taking the position as a center to respectively extend to both ends of the elastic wave signal, finding a left position and a right position respectively where a difference between two adjacent amplitudes is less than a difference threshold, and taking the left position as a corrected signal start point and taking the right position as a corrected signal end point;

the signal start point comprises the corrected signal start point, and the signal end point comprises the corrected signal end point;

the determining the valid elastic wave signal further comprises:

intercepting the elastic wave signal between the signal start point and the signal end point, reducing or amplifying the intercepted elastic wave signal in time domain to obtain the valid elastic wave signal with a preset length; or, intercepting the elastic wave signal between the signal start point and the signal end point, and taking the intercepted elastic wave signal as the valid elastic wave signal.

11. The touch sensing method according to claim 1, after the acquiring the elastic wave signals detected by the plurality of elastic wave sensors mounted on the touch sensing apparatus, the method further comprises: determining whether interaction is started according to the acquired elastic wave signals, which comprises:

determining whether at least one of an absolute change and a relative change of an elastic wave signal is greater than an interaction threshold set for the elastic wave signal, according to an elastic wave signal collected at a current moment and an elastic wave signal collected at a previous moment, and when at least one of the absolute change and the relative change of the elastic wave signal is greater than the interaction threshold set for the elastic wave signal, determining that the interaction is started;

wherein the absolute change of the elastic wave signal comprises: summing signal values of elastic wave signals from the plurality of elastic wave sensors collected at the current moment, and finding a maximum value of the signal values of the elastic wave signals from the plurality of elastic wave sensors collected at the current moment; the determining whether the absolute change of the elastic wave signal is greater than the interaction threshold set for the elastic wave signal comprises: when a result of summing the signal values is larger than a set first interaction threshold and a result of finding the maximum value of the signal values is larger than a set second interaction threshold, determining that the absolute change of the elastic wave signal is larger than the interaction threshold set for the elastic wave signal;

a manner of determining the relative change of the elastic wave signal comprises: for a collected elastic wave signal from each elastic wave sensor of the plurality of elastic wave sensors, calculating a difference value of a signal value of the elastic wave signal collected at the current moment and a signal value of the elastic wave signal collected at the previous moment; after a plurality of difference values are calculated according to collected elastic wave signals from the plurality of elastic wave sensors, determining a maximum value of the plurality of difference values.

12. The touch sensing method according to claim 1, wherein before performing the touch sensing according to the feature of the elastic wave signals, the method further comprises: determining whether the current touch sensing is valid touch sensing according to whether a touch force reaches a threshold, the touch force is obtained using a following method: when touch is detected, acquiring a signal of at least one elastic wave sensor of the plurality of elastic wave sensors, determining the touch force according to the signal of the at least one elastic wave sensor of the plurality of elastic wave sensors, a touch position, and a standard force template, wherein the standard force template is obtained using a following manner: dotting a plurality of preset calibration positions under a preset calibration force, acquiring dotting signals of the plurality of elastic wave sensors, generating an eigenvalue curve of the at least one elastic wave sensor of the plurality of elastic wave sensors according to eigenvalues of the dotting signals, and calibrating eigenvalue curves of the plurality of elastic wave sensors to enable sensitivities of the plurality of elastic wave sensors to be consistent, and taking the calibrated eigenvalue curves as the standard force template.

13. The touch sensing method according to claim 12, wherein the calibrating the eigenvalue curves of the plurality of elastic wave sensors to enable the sensitivities of the plurality of elastic wave sensors to be consistent comprises:
selecting an eigenvalue curve from the eigenvalue curves of the plurality of elastic wave sensors as a reference eigenvalue curve, and selecting a reference point on the reference eigenvalue curve;
determining a calibration coefficient of a corresponding elastic wave sensor according to a difference between a value of a corresponding point on an eigenvalue curve other than the reference eigenvalue curve and the reference point, wherein the calibration coefficient makes the value of the corresponding point equal to a value of the reference point after being calibrated by the calibration coefficient; and
calibrating the eigenvalue curve other than the reference eigenvalue curve through a corresponding calibration coefficient.

14. The touch sensing method according to claim 13, wherein the determining the touch force according to the signal of the at least one elastic wave sensor of the plurality of elastic wave sensors, the touch position, and the standard force template, comprises:
determining a force vector Y according to the touch position and the standard force template, wherein the force vector Y comprises values of a plurality of elastic wave sensors corresponding to the touch position in the standard force template, determining a value of k according to $k=(Y^TY)^{-1}Y^Tx$, and determining the touch force to be k*preset calibration force, wherein $Y^T$ corresponds to a force vector, and * is a vector formed by the elastic wave signals of the plurality of elastic wave sensors after being calibrated by corresponding calibration coefficients.

15. The touch sensing method according to claim 14, further comprising:
for a same preset calibration position, performing a normalization processing on values of calibrated eigenvalue curves of the plurality of elastic wave sensors, and generating a standard position template, wherein the normalization processing comprises: normalizing values of the calibrated eigenvalue curves of the plurality of elastic wave sensors corresponding to the same preset calibration position with a maximum value of the values of the calibrated eigenvalue curves of the plurality of elastic wave sensors corresponding to the same preset calibration position; and
determining the touch position according to the elastic wave signals of the plurality of elastic wave sensors after being calibrated by the corresponding calibration coefficients and the standard position template.

16. The touch sensing method according to claim 15, wherein the determining the touch position according to the elastic wave signals of the plurality of elastic wave sensors after being calibrated by the corresponding calibration coefficients and the standard position template comprises:
performing a normalization processing on the vector xx formed by the elastic wave signals of the plurality of elastic wave sensors after being calibrating by the corresponding calibration coefficients to obtain x'; and
calculating a distance between x' and a vector formed by the normalized values of the calibrated eigenvalue curves of the plurality of the elastic wave sensors corresponding to the same preset calibration position in the standard position template, and taking a preset calibration position corresponding to a vector with a smallest distance as the touch position.

17. The touch sensing method according to claim 12, wherein the acquiring the elastic wave signals of the plurality of elastic wave sensors comprises:
collecting data of the at least one elastic wave sensor of the plurality of elastic wave sensors at a preset sampling frequency, and down-sampling the collected data of the at least one elastic wave sensor at a predetermined down-sampling level, and taking the down-sampled collected data of the at least one elastic wave sensor as the elastic wave signals of the plurality of elastic wave sensors, wherein the predetermined down-sampling level is determined using a following manner:
collecting data of the plurality of elastic wave sensors at the preset sampling frequency, and calculating a touch position and a touch force based on the collected data of the plurality of elastic wave sensors;
down-sampling the collected data at a plurality of down sampling levels respectively, calculating a touch position and a touch force respectively according to down-sampled collected data with different down sampling levels to obtain a touch position and a touch force corresponding to each down-sampling level of the plurality of down-sampling levels, determining a position linearity parameter according to touch positions corresponding to the different down sampling levels, determining a force continuity parameter according to touch forces corresponding to the different down sampling levels, and determining a down-sampling level according to the position linearity parameter and the force continuity parameter; wherein the position linearity parameter is determined according to change of an average touch position at adjacent moments in a plurality of moments and a quantity of distances of touch positions at the adjacent moments being equal to a minimum resolution position unit, and the force continuity parameter is a parameter indicating continuity of touch force changes at the plurality of moments;

wherein the position linearity parameter is determined according to a following formula:

$$L = \frac{\sum_{k=2}^{N}|S_k - S_{k-1}|}{N-1} * \sum_{k=2}^{N} T_k, \quad T_k = \begin{cases} 1 & \text{if } |S_k - S_{k-1}| = \Delta S \\ 0 & \text{other} \end{cases},$$

wherein L is the position linearity parameter, N is a natural number and N is greater than or equal to 2, $S_k$ represents a touch position at moment k, $S_{k-1}$ represents a touch position at moment k−1, ΔS represents the minimum resolution position unit;

wherein the force continuity parameter is determined according to a following formula:

$$C = \sum_{k=3}^{N} \frac{\sqrt{|F_k - F_{k-1}| * |F_{k-1} - F_{k-2}|}}{|F_k - F_{k-1}| + |F_{k-1} - F_{k-2}|},$$

formula wherein C is the force continuity parameter, $F_k$ represents a touch force at moment k, $F_{k-1}$ represents a touch force at moment k−1, $F_{k-2}$ represents a touch force at moment k−2, N is a natural number and N is greater than or equal to 3.

18. The touch sensing method according to claim 17, wherein the determining the down-sampling level according to the position linearity parameter and the force continuity parameter comprises:
selecting a down-sampling level corresponding to a touch force and a touch position that maximizes a product of the position linearity parameter and the force continuity parameter; or,
selecting a down-sampling level corresponding to a touch force and a touch position that maximizes $y_i$:

$$y_i = w_L * \frac{L_i}{\max(L_1, L_2, \ldots, L_M)} + w_C * C_i$$

wherein $w_L$ is a preset weight of a position linearity parameter, $w_C$ is a preset weight of a force continuity parameter, a value of $w_L$ is 0 to 1, a value of $w_C$ is 0 to 2, and $$w_L + \frac{w_C}{2} = 1$$

$L_i$ is a position linearity parameter determined according to a touch position corresponding to an i-th down-sampling level, $C_i$ is a force continuity parameter determined according to a touch force corresponding to the i-th down-sampling level, a value of i is 1 to M, and M is a quantity of down-sampling levels.

19. A touch sensing apparatus comprising a signal processing apparatus and the plurality of elastic wave sensors, wherein the signal processing apparatus is electrically connected with the plurality of elastic wave sensors and is configured to implement the touch sensing method according to claim 1.

* * * * *